(12) United States Patent
Matsumoto et al.

(10) Patent No.: US 11,321,860 B2
(45) Date of Patent: May 3, 2022

(54) THREE-DIMENSIONAL MEASUREMENT APPARATUS, THREE-DIMENSIONAL MEASUREMENT METHOD AND NON-TRANSITORY COMPUTER READABLE MEDIUM

(71) Applicant: OMRON Corporation, Kyoto (JP)

(72) Inventors: Shinya Matsumoto, Osaka (JP); Yasuhiro Ohnishi, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 60 days.

(21) Appl. No.: 16/963,245

(22) PCT Filed: Feb. 6, 2019

(86) PCT No.: PCT/JP2019/004146
§ 371 (c)(1),
(2) Date: Jul. 19, 2020

(87) PCT Pub. No.: WO2019/159769
PCT Pub. Date: Aug. 22, 2019

(65) Prior Publication Data
US 2021/0358147 A1    Nov. 18, 2021

(30) Foreign Application Priority Data

Feb. 14, 2018   (JP) .............................. JP2018-023606

(51) Int. Cl.
*G06K 9/46* (2006.01)
*G06T 7/521* (2017.01)
(Continued)

(52) U.S. Cl.
CPC ............ *G06T 7/521* (2017.01); *G01B 11/254* (2013.01); *G06T 7/62* (2017.01); *G06T 7/73* (2017.01); *G06V 10/145* (2022.01); *G06V 10/40* (2022.01)

(58) Field of Classification Search
CPC .. G06T 7/521; G06T 7/62; G06T 7/73; G01B 11/254; G01B 11/2509; G01B 11/2513; G06K 9/2036; G06K 9/46
See application file for complete search history.

(56) References Cited

U.S. PATENT DOCUMENTS 6,195,455 B1 *   2/2001   Mack ................... H04N 13/243
                                                       348/E13.016
6,510,244 B2 *   1/2003   Proesmans ......... G01B 11/2513
                                                       348/42
(Continued)

FOREIGN PATENT DOCUMENTS

CN           1632451          6/2005
CN           1632451 A  *     6/2005
(Continued)

OTHER PUBLICATIONS

Pattern codication strategies in structured light systems, Joaquim Salvi et al., PERGAMON, 2003, pp. 827-849 (Year: 2003).*

(Continued)

*Primary Examiner* — Jayesh A Patel
(74) *Attorney, Agent, or Firm* — JCIPRNET

(57) ABSTRACT

The three-dimensional measurement apparatus includes a light projecting unit projects, onto a target, a pattern in which data is encoded, an image capturing unit captures an image of the target onto which the pattern is projected, and a calculation unit calculates positions of a three-dimensional point group based on positions of the feature points and the decoded data, in which the pattern includes unit patterns that each expresses at least two bits and are used in order to calculate the positions of the three-dimensional point group, the unit patterns each includes a first region and a second region that has an area that is larger than an area of the first (Continued)

region, and an area ratio between the first region and the second region is at least 0.3 and not more than 0.9.

15 Claims, 18 Drawing Sheets

(51) Int. Cl.
*G06T 7/62* (2017.01)
*G06T 7/73* (2017.01)
*G01B 11/25* (2006.01)
*G06V 10/40* (2022.01)
*G06V 10/145* (2022.01)

(56) References Cited

U.S. PATENT DOCUMENTS

| | | | | |
|---|---|---|---|---|
| 8,208,719 | B2 * | 6/2012 | Gordon | G06V 10/147 382/154 |
| 10,240,915 | B2 * | 3/2019 | Fuchikami | G01B 11/2536 |
| 2004/0151365 | A1 * | 8/2004 | An Chang | G01B 11/2518 382/154 |
| 2005/0036672 | A1 * | 2/2005 | Chen | G01B 11/2513 382/154 |
| 2008/0118143 | A1 * | 5/2008 | Gordon | G06V 10/145 382/154 |
| 2011/0221891 | A1 * | 9/2011 | Sonoda | G01B 11/2513 348/135 |
| 2013/0093881 | A1 * | 4/2013 | Kuwabara | G01B 11/25 348/135 |
| 2015/0103358 | A1 * | 4/2015 | Flascher | G01B 11/2513 356/603 |
| 2015/0206325 | A1 * | 7/2015 | Furihata | G06T 7/586 382/154 |
| 2015/0268035 | A1 * | 9/2015 | Furihata | G06T 7/521 348/136 |
| 2015/0347833 | A1 * | 12/2015 | Robinson | G06K 9/00536 348/49 |
| 2016/0050401 | A1 | 2/2016 | Gordon | |
| 2016/0286202 | A1 * | 9/2016 | Romano | G01S 17/46 |
| 2016/0309140 | A1 * | 10/2016 | Wang | H04N 13/00 |
| 2018/0106606 | A1 * | 4/2018 | Fujita | G01S 17/89 |
| 2018/0118143 | A1 * | 5/2018 | Ponder | B62D 35/001 |
| 2018/0306577 | A1 * | 10/2018 | Taubin | G06T 7/521 |
| 2021/0358147 | A1 * | 11/2021 | Matsumoto | G06V 10/145 |

FOREIGN PATENT DOCUMENTS

| | | | | |
|---|---|---|---|---|
| CN | 101968624 | | 2/2011 | |
| CN | 102959355 | | 3/2013 | |
| CN | 103512558 | | 1/2014 | |
| CN | 105659106 | | 6/2016 | |
| CN | 104197861 | | 3/2017 | |
| CN | 106796661 | | 5/2017 | |
| CN | 106796661 A | * | 5/2017 | ......... G01B 11/2513 |
| CN | 107202554 | | 9/2017 | |
| CN | 107615019 | | 1/2018 | |
| CN | 108271407 | | 7/2018 | |
| CN | 109690241 | | 4/2019 | |
| CN | 109690241 A | * | 4/2019 | ......... G01B 11/2513 |
| EP | 3480556 | | 5/2019 | |
| JP | 2011028042 | | 2/2011 | |
| JP | 201279294 A | * | 4/2012 | |
| JP | 2012177671 | | 9/2012 | |
| JP | 2016540189 | | 12/2016 | |
| WO | WO-2005024720 A2 | * | 3/2005 | ......... G01B 11/2509 |
| WO | WO-2009150799 A1 | * | 12/2009 | ............. G01B 11/25 |
| WO | WO-2010041254 A2 | * | 4/2010 | ........... G01B 11/002 |
| WO | WO-2011013373 A1 | * | 2/2011 | ......... G01B 11/2536 |
| WO | WO-2012066501 A | * | 5/2012 | ............. G01B 11/25 |
| WO | WO-2013088895 A1 | * | 6/2013 | ............. G01B 11/25 |
| WO | WO-2013132494 A1 | * | 9/2013 | ............. G01B 11/25 |
| WO | 2015034048 | | 3/2015 | |
| WO | WO-2015133053 A1 | * | 9/2015 | ......... G01B 11/2509 |
| WO | 2016199323 | | 12/2016 | |
| WO | 2018070210 | | 4/2018 | |

OTHER PUBLICATIONS

Three-dimensional point cloud alignment detecting fiducial markers by structured light stereo imaging, Sandro Barone et al., Machine Vision and Applications, 2012, pp. 217-229 (Year: 2012).*
3-D Object Model Recovery From 2-D Images Using Structured Light, Philippe Lavoie et al., IEEE, 0018-9456, 2004, pp. 437-443 (Year: 2004).*
Structured-light 3D surface imaging:a tutorial, Jason Geng, IEEE, published Mar. 31, 2011 (Doc. ID 134160), pp. 128-160 (Year: 2011).*
Dynamic scene shape reconstruction using a single structured light pattern, Hiroshi Kawasaki et al., IEEE, 978-1-4244-2243-2, 2008, pp. 1-8 (Year: 2008).*
Pattern codification strategies in structured light systems, Joaquim Salvi et al., PERGAMON, 2003, pp. 827-849 (Year: 2003).*
"Office Action of China Counterpart Application", dated May 24, 2021, with English translation thereof, pp. 1-13.
"International Search Report (Form PCT/ISA/210) of PCT/JP2019/004146," dated May 7, 2019, with English translation thereof, pp. 1-4.
"Written Opinion of the International Searching Authority (Form PCT/ISA/237) of PCT/JP2019/004146," dated May 7, 2019, with English translation thereof, pp. 1-8.
"Search Report of Europe Counterpart Application", dated Oct. 7, 2021, p. 1-p. 7.

* cited by examiner

|  | 6 pixels | 5 pixels | 4 pixels |
|---|---|---|---|
| No change | | | |
| First condition | | | |
| Second condition | | | |
| Third condition | | | |
| Fourth condition | | | |

THREE-DIMENSIONAL MEASUREMENT APPARATUS, THREE-DIMENSIONAL MEASUREMENT METHOD AND NON-TRANSITORY COMPUTER READABLE MEDIUM

CROSS-REFERENCE TO RELATED APPLICATION

This application is a 371 application of the International PCT application serial no. PCT/JP2019/004146, filed on Feb. 6, 2019, which claims the priority benefits of Japan Patent Application No. 2018-023606, filed on Feb. 14, 2018. The entirety of each of the above-mentioned patent applications is hereby incorporated by reference herein and made a part of this specification.

FIELD

The present disclosure relates to a three-dimensional measurement apparatus, a three-dimensional measurement method, and a three-dimensional measurement program.

BACKGROUND

In recent years, systems have been used which are configured to measure a three-dimensional shape of a target by projecting an encoded pattern or a random dot pattern onto the target and analyzing an image obtained by capturing the target onto which this pattern is projected.

Patent Literature 1 discloses a method for determining a three-dimensional shape of an object, the method including acquiring an image obtained by capturing an object onto which a pattern is projected, selecting a reference component from the image, finding relative coordinates of pattern components other than the reference component, and determining a relative depth of a position of the object through linear transformation of the relative coordinates based on a geometric model.

Patent Literature 2 discloses a method in which a first image and a second image of an object onto which an encoded pattern is projected are captured, an image region of the first image is searched for along an epipolar line in the second image, and thereby distance data is acquired from a two-dimensional image of the object.

CITATION LIST

Patent Literature

Patent Literature 1: U.S. Pat. No. 6,510,244
Patent Literature 2: U.S. Pat. No. 8,208,719

SUMMARY

Problems to be Solved

Patent Literature 1 and Patent Literature 2 disclose techniques for measuring a three-dimensional shape of a relatively large target such as a person, and if a three-dimensional shape of a relatively small target is measured, it is necessary to measure the three-dimensional shape of the target at higher resolution. In view of this, it is conceivable to project a higher-density pattern onto a target. However, the inventors found that, if three-dimensional shapes of relatively small targets, such as components loaded in bulk, are measured, a pattern may be projected onto a slant surface of the target and distort, the contrast of the pattern may decrease due to the influence of ambient light or the texture of the target, for example, the pattern may deform due to the unevenness of a surface of the target in some cases, and it may sometimes be difficult to measure the three-dimensional shape by simply miniaturizing the pattern (increasing the resolution of the pattern). That is, simply miniaturizing the pattern will impair the robustness against a change in image capturing conditions.

In view of this, the present invention provides a three-dimensional measurement apparatus, a three-dimensional measurement method, and a three-dimensional measurement program with which a three-dimensional shape of a target can be measured at higher resolution while the robustness against a change in the image capturing conditions is increased.

Means to Solve Problems

A three-dimensional measurement apparatus according to one aspect of the present disclosure includes a light projecting unit configured to project, onto a target, a pattern in which data is encoded with a two-dimensional structure (encoded two-dimensionally), an image capturing unit configured to capture an image of the target onto which the pattern is projected, and a calculation unit configured to extract feature points of the pattern and to calculate positions of a three-dimensional point group expressing (representing) a three-dimensional shape of the target based on positions of the feature points in the image and the decoded data, in which the pattern includes a plurality of unit patterns of minimum units that each express at least two bits, include a feature point, and are used in order to calculate the positions of the three-dimensional point group, the unit patterns each include a first region and a second region that is distinguished from the first region and has an area that is larger than an area of the first region, and an area ratio obtained by dividing the area of the first region by the area of the second region is at least 0.3 and not more than 0.9. Here, the "target" may be any object, and may be components loaded in bulk, for example. Also, the two-dimensional structure of the pattern may be any structure, and may be a structure in which unit patterns are arranged in the form of a grid. The feature point of the pattern may be a center point of the unit pattern, for example. Also, the unit pattern may be such that any pattern is represented by the first region and the second region inside a square, for example. Note that the outer shape of the unit pattern may also be a rectangle or a parallelogram. Also, the first region and the second region may be distinguished from each other according to a pixel value of each pixel in the image captured by the image capturing unit. For example, the first region and the second region may be distinguished by a brightness value of a pixel, or the first region and the second region may be distinguished by whether or not the brightness value is at least a threshold.

According to this aspect, the area ratio between the first region and the second region that are included in the unit pattern is at least 0.3 and not more than 0.9, and thus, even if the image capturing conditions have changed, it is possible to distinguish the first region and the second region, to extract the feature point of the unit pattern, and to decode data expressed by the unit pattern. Thus, it is possible to measure the three-dimensional shape of the target at higher resolution while increasing the robustness against a change in the image capturing conditions.

In the above-described aspect, the unit pattern may be a quadrangle with a short side of at least 3 pixels and not more than 10 pixels on the image. Herein, the short side of the unit pattern may be the shortest side of the four sides of the unit pattern.

According to this aspect, the area ratio between the first region and the second region that are included in the unit pattern is at least 0.3 and not more than 0.9, and the unit pattern is a quadrangle with a short side of at least 3 pixels on the image, and thus, even if the image capturing conditions have changed, it is possible to identify the first region and the second region, to extract the feature point of the unit pattern, and to decode data expressed by the unit pattern. Also, the area ratio between the first region and the second region that are included in the unit pattern is at least 0.3 and not more than 0.9, and the unit pattern is a quadrangle with a short side of not more than 10 pixels on the image, and thus the two-dimensional structure in which data is encoded can be arranged at high density and the density of feature points that are extracted can be increased. Thus, it is possible to measure a three-dimensional shape of a target at higher resolution while increasing the robustness against a change in the image capturing conditions.

In the above-described aspect, the area ratio obtained by dividing the area of the first region by the area of the second region may be at least 0.3 and not more than 0.9 on the image.

According to this aspect, not only the area ratio obtained by dividing the area of the first region of the unit pattern projected by the light projecting unit by the area of the second region, but also the area ratio obtained by dividing the area of the first region in the unit pattern captured by the image capturing unit by the area of the second region is at least 0.3 and not more than 0.9, and thus it is possible to measure a three-dimensional shape of a target while increasing the robustness against a change in the image capturing conditions.

In the above-described aspect, the apparatus may also further include a setting unit configured to set a range of the area ratio of the pattern projected by the light projecting unit, in accordance with the number of pixels of a short side of the unit pattern on the image.

According to this aspect, by setting the range of the area ratio between the first region and the second region that are included in the unit pattern in accordance with the number of pixels of the short side of the unit pattern on the image, it is possible to set the range of the area ratio between the first region and the second region according to the density of the unit pattern on the image, and to adjust the balance between the resolution at which the three-dimensional shape of the target is measured and the robustness against a change in the image capturing conditions.

In the above-described aspect, the setting unit may also be configured to narrow the range of the area ratio as the number of pixels of the short side of the unit pattern becomes smaller on the image.

According to this aspect, it is possible to narrow the range of the area ratio between the first region and the second region as the density of the unit pattern increases on the image, and to narrow down the range of the area ratio between the first region and the second region to such a range that the robustness against a change in the image capturing conditions can be ensured as the resolution at which the three-dimensional shape of the target is measured increases. Thus, it is possible to adjust the balance between the resolution at which the three-dimensional shape of the target is measured and the robustness against a change in the image capturing conditions.

In the above-described aspect, the first region and the second region may also be distinguished by brightness and darkness of the light projected by the light projecting unit.

According to this aspect, by distinguishing the first region and the second region by brightness and darkness of the light, even an image capturing unit configured to capture a monochromatic image can identify its pattern, and the cost of the three-dimensional measurement apparatus can be reduced by simplifying the configuration of the image capturing unit.

In the above-described aspect, the first region and the second region may also be distinguished by wavelength bands of the light projected by the light projecting unit.

According to this aspect, by distinguishing the first region and the second region by wavelength bands of the light, even if the target is irradiated with white light such as ambient light, a difference between the first region and the second region is unlikely to vary, and the first region and the second region can be easily identified.

In the above-described aspect, the first region and the second region may also be distinguished by polarization of the light projected by the light projecting unit.

According to this aspect, by distinguishing the first region and the second region by polarization of the light, even if the target is irradiated with light such as ambient light, a difference between the first region and the second region is unlikely to vary, and the first region and the second region can be easily identified.

In the above-described aspect, the unit pattern may also include a two-dimensional shape in which the first region is continuous and not divided.

This aspect makes it possible to simplify the two-dimensional structure of the unit pattern and facilitate identifying the first region and the second region.

In the above-described aspect, the unit pattern may also include a two-dimensional shape in which the first region is divided while flanking the second region.

According to this aspect, it is possible to constitute various two-dimensional structures by unit patterns, and to increase the density of data encoded by the unit pattern. This makes it possible to reduce the number of unit patterns that need to be decoded in order to specify a row of the pattern, to perform matching between the pattern on the image and the projected pattern through less computation, and to reduce a calculation load of image recognition for measuring the three-dimensional shape of the target.

In the above-described aspect, the pattern may also include a unit pattern including a two-dimensional shape in which the first region is continuous and not divided and a unit pattern including a two-dimensional shape in which the first region is divided while flanking the second region.

This aspect makes it possible to increase the variation of the two-dimensional structure of the unit pattern, to increase the number of bits that can be expressed by the unit pattern, and to increase the density of data encoded by the pattern. Thus, it is possible to reduce the number of unit patterns that need to be decoded in order to specify a row of the pattern, to perform matching between the pattern on the image and the projected pattern through less computation, and to reduce a calculation load of image recognition for measuring the three-dimensional shape of the target.

In the above-described aspect, the first region may also be separated into two regions while flanking the second region in the unit pattern.

This aspect makes it possible to make the two-dimensional structure of the unit pattern relatively simple, to increase the amount of data that can be expressed by the unit pattern while facilitating identifying the first region and the second region, and to increase the density of data encoded by the pattern. Thus, it is possible to reduce the number of unit patterns that need to be decoded in order to specify a row of the pattern, to perform matching between the pattern on the image and the projected pattern through less computation, and to reduce a calculation load of image recognition for measuring the three-dimensional shape of the target.

In the above-described aspect, the first region may also be separated into at least three regions while flanking the second region in the unit pattern.

This aspect makes it possible to make the two-dimensional structure of the unit pattern relatively complicated, increases the number of bits that can be expressed by the unit pattern, and facilitates specifying the position of the unit pattern. Thus, it is possible to shorten a window matching processing time while ensuring the robustness against a change in the image capturing conditions, and to reduce the calculation load of image recognition for measuring the three-dimensional shape of the target.

In the above-described aspect, the light projecting unit may also include a modulation element configured to modulate a size of the pattern to be projected.

According to this aspect, it is possible to modulate the size of the pattern depending on the unevenness or inclination of a target onto which the pattern is projected, and to ensure the robustness against a change in the image capturing conditions. Also, by increasing the number of pixels of a short side on the image through modulation such that the size of the pattern increases, it is possible to reduce the number of three-dimensional point groups and to reduce the calculation load of image recognition for measuring the three-dimensional shape of the target.

A three-dimensional measurement method according to another aspect of the present disclosure includes projecting, onto a target, a pattern in which data is encoded with a two-dimensional structure, capturing an image of the target onto which the pattern is projected, extracting feature points of the pattern and calculating positions of a three-dimensional point group expressing a three-dimensional shape of the target based on positions of the feature points in the image and the decoded data, in which the pattern includes a plurality of unit patterns that each express at least two bits, include a feature point, and are used in order to calculate the positions of the three-dimensional point group, and the unit patterns each are a quadrangle with a short side of at least 3 pixels and not more than 10 pixels on the image.

According to this aspect, the unit pattern is a quadrangle with a short side of at least 3 pixels on the image, and thus, even if the image capturing conditions have changed, it is possible to extract the feature point of the unit pattern, and to decode data expressed by the unit pattern. Also, the unit pattern is a quadrangle with a short side of not more than 10 pixels on the image, and thus the two-dimensional structure in which data is encoded can be arranged at high density and the density of feature points that are extracted can be increased. Thus, it is possible to measure a three-dimensional shape of a target at higher resolution while increasing the robustness against a change in the image capturing conditions.

A three-dimensional measurement program according to another aspect of the present disclosure causes an arithmetic unit provided in a three-dimensional measurement apparatus including a light projecting unit configured to project, onto a target, a pattern in which data is encoded with a two-dimensional structure and an image capturing unit configured to capture an image of the target onto which the pattern is projected, to operate as a calculation unit configured to extract feature points of the pattern and to calculate positions of a three-dimensional point group expressing a three-dimensional shape of the target based on positions of the feature points in the image and the decoded data, in which the pattern includes a plurality of unit patterns that each express at least two bits, include a feature point, and are used in order to calculate the positions of the three-dimensional point group, and the unit patterns each are a quadrangle with a short side of at least 3 pixels and not more than 10 pixels on the image.

According to this aspect, the unit pattern is a quadrangle with a short side of at least 3 pixels on the image, and thus, even if the image capturing conditions have changed, it is possible to extract the feature point of the unit pattern, and to decode the data expressed by the unit pattern. Also, the unit pattern is a quadrangle with a short side of not more than 10 pixels on the image, and thus the two-dimensional structure in which data is encoded can be arranged at high density and the density of feature points that are extracted can be increased. Thus, it is possible to measure a three-dimensional shape of the target at higher resolution while increasing the robustness against a change in the image capturing conditions.

Effect

According to the present invention, it is possible to provide a three-dimensional measurement apparatus, a three-dimensional measurement method, and a three-dimensional measurement program with which a three-dimensional shape of a target can be measured at higher resolution while the robustness against a change in the image capturing conditions is increased.

BRIEF DESCRIPTION OF THE DRAWINGS

FIG. 6 is a diagram showing examples of patterns that are disordered by a change in image capturing conditions.

FIG. 15 is a list of examples of patterns that are projected by the light projecting unit of the three-dimensional measurement apparatus according to this embodiment, constituted by a combination of figures with different encoded patterns, and have different area ratios between the first region and the second region.

DETAILED DESCRIPTION

Figure 1:
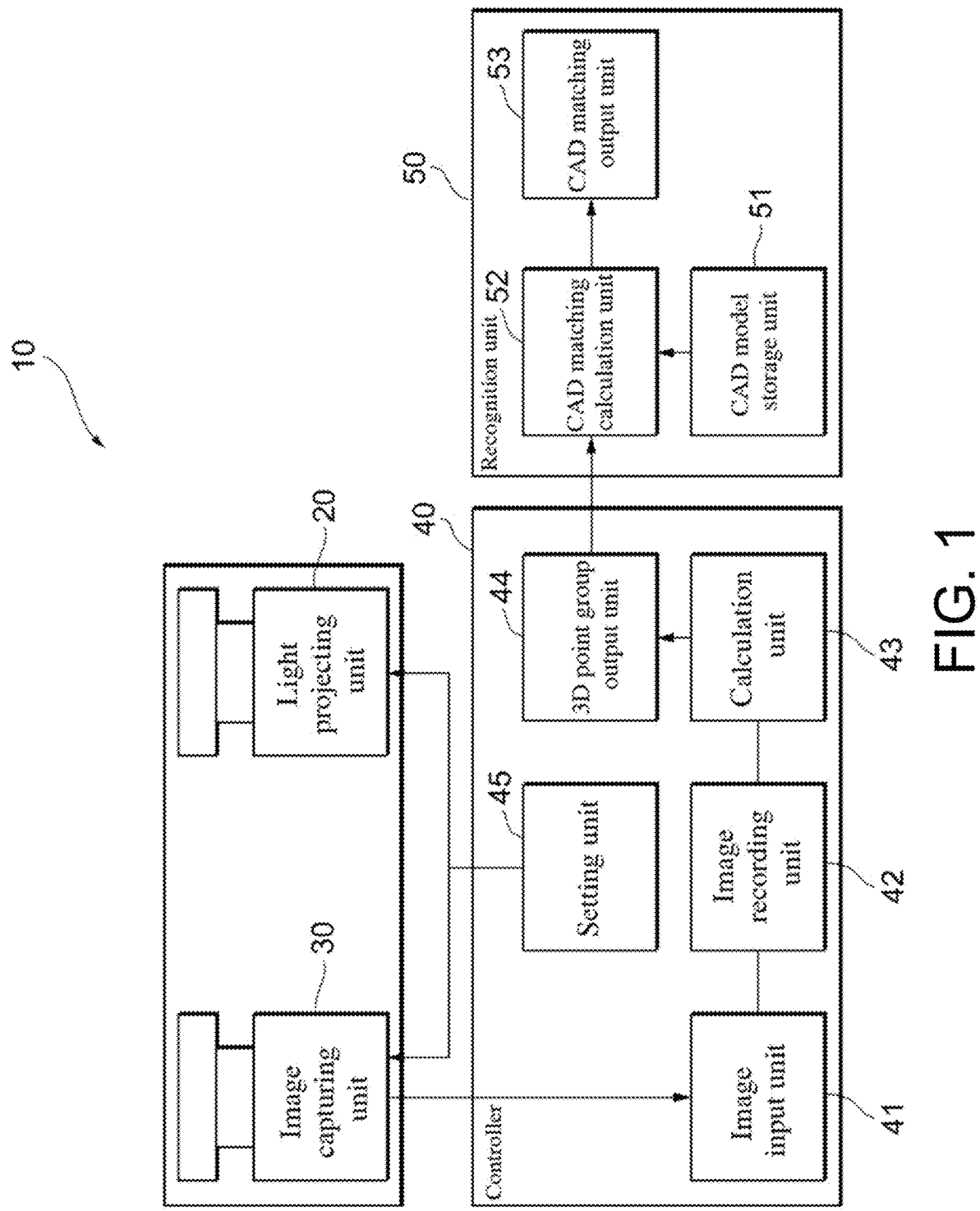
FIG. 1 is a functional block diagram of a three-dimensional measurement apparatus according to an embodiment of this disclosure.

Hereinafter, an embodiment (hereinafter, referred to as "the present embodiment") according to one aspect of the present invention will be described with reference to the drawings. Note that constituent elements with the same reference numeral have the same or similar configuration in the drawings.

§ 1 Application Example

First, an example of a scenario to which the present invention is applied will be described with reference to FIG. 1. FIG. 1 is a functional block diagram of a three-dimensional measurement apparatus 10 according to an embodiment of the present disclosure. The three-dimensional measurement apparatus 10 according to the present embodiment includes a light projecting unit 20 configured to project, onto a target, a pattern in which data is encoded with a two-dimensional structure, an image capturing unit 30 configured to capture an image of the target onto which the pattern is projected, a controller 40 configured to control the light projecting unit 20 and the image capturing unit 30 and output a three-dimensional point group expressing a three-dimensional shape of the target based on the captured image, and a recognition unit 50 configured to recognize the three-dimensional shape of the target based on the three-dimensional point group. Note that the three-dimensional measurement apparatus 10 does not necessarily have to include the recognition unit 50, and the recognition unit 50 may also be constituted by a separate apparatus capable of communicating with the three-dimensional measurement apparatus 10. Also, the target may be components loaded in bulk, or any articles such as components that are horizontally placed.

The light projecting unit 20 may project, onto the target, a pattern that includes a plurality of unit patterns that each express at least two bits, include a feature point and are used in order to calculate positions of a three-dimensional point group. The light projecting unit 20 may also project, onto the target, a pattern in which quadrilateral unit patterns are arranged in the form of a grid, for example. As a matter of course, the pattern may include a unit pattern with any shape, and may also include a unit pattern that has at least any one of circular, curved surface, random dot, grid, and undulating shapes, for example. Also, the unit pattern may be arranged such that rows of the grid can be specified by the order of arrangement of the unit patterns. The quadrilateral unit pattern may be such that any pattern is represented inside a square, and the outer shape of the unit pattern may also be a rectangle, or a parallelogram, for example.

The image capturing unit 30 is disposed at a predetermined distance and a predetermined angle with respect to the light projecting unit 20, and captures an image of the target onto which the pattern is projected. The pattern that has deformed depending on e.g. the position and the orientation of the target is captured in the image. The number of image capturing units 30 may be one, and the image capturing unit 30 should capture one image in order to measure the three-dimensional shape of the target. As a matter of course, the three-dimensional measurement apparatus 10 may also include a plurality of image capturing units. Also, the image capturing unit 30 may capture one image of the target, or capture a plurality of images of the target.

The controller 40 extracts feature points of the pattern and calculates the positions of the three-dimensional point group expressing the three-dimensional shape of the target based on the positions of the feature points in the image and decoded data. In the present embodiment, the controller 40 extracts the centers of the unit patterns as feature points, and decodes data expressed by the unit patterns based on two-dimensional shapes of a first region and a second region that are included in the unit patterns. Herein, the first region and the second region of the unit pattern are regions that can be distinguished from each other, and may be regions that are distinguished by brightness and darkness of the light that is projected, for example. Also, the first region and the second region on the image may be distinguished from each other according to a pixel value of each pixel in the image captured by the image capturing unit 30. For example, the first region and the second region may be distinguished by a brightness value of a pixel, or the first region and the second region may be distinguished by whether or not the brightness value is at least a threshold. In the present embodiment, the second region is defined as a region whose area is larger than that of the first region. Note that the definition of the first region and the definition of the second region may also be reversed, and the first region may also be defined as a region whose area is larger than that of the second region. Note that the controller 40 should extract feature points of the pattern that is projected in the depth of field of the image capturing unit 30, and it is not necessary to extract feature points of a pattern that is projected outside the depth of field and captured in blur. That is, if the first region and the second region are not clearly distinguished due to the influence of blur, it is not necessary to use their unit patterns for calculating the positions of the three-dimensional point group.

With regard to a row to which a pixel of interest belongs on the image, the controller 40 decodes data expressed by adjacent unit patterns, and specifies which row of the pattern projected by the light projecting unit 20 the row to which the pixel of interest belongs corresponds to, based on the order in which the data is arranged. When a row of the pattern projected by the light projecting unit 20 is specified, a plane that passes through the specified row and a light source of the light projecting unit 20 and penetrates through the target is specified. Also, a straight line is specified which passes through the pixel of interest on the image and a unit pattern that corresponds to the pixel of interest in the pattern that was projected onto the target. Herein, if the distance and the angle between the light projecting unit 20 and the image capturing unit 30 are known, the distance from an intersection point of the plane that passes through the light projecting unit 20 and the straight line that passes through the image capturing unit 30 to the three-dimensional measurement apparatus 10, that is, the distance to the target can be calculated using triangulation. In this manner, the controller 40 can calculate the position of one point of the three-dimensional point group expressing the three-dimensional shape of the target from one of the unit patterns. Also, the controller 40 may specify a plurality of unit patterns included in the pattern through window matching, and calculate the positions of the three-dimensional point group for each of the plurality of specified unit patterns. Note that the controller 40 may also specify not only a row of the pattern projected by the light projecting unit 20 but also its column, using an epipolar constraint.

It is conceivable that in order to measure the three-dimensional shape of the target at higher resolution, the unit patterns in which data is encoded are arranged at higher density and the resulting pattern is projected onto the target. With regard to the size of the unit pattern, there is a restriction due to the resolution of the image capturing unit 30, that is, the density of the light-receiving element of the image capturing unit 30. If the unit patterns in which data is encoded are arranged at higher density and the short side of the unit pattern on the image has less than 3 pixels, it is difficult to extract feature points of the unit patterns based on the image and identify the first region and the second region of the unit patterns, and thus it is difficult to measure the three-dimensional shape. In view of this, it is desirable that the size of the unit pattern is such that its short side has at least 3 pixels on the image. If the short side of the unit pattern has at least 3 pixels on the image, it is possible to identify the first region and the second region by brightness and darkness of the pixels, for example, and to decode data expressed by the feature points of the unit pattern and the unit patterns. Note that the short side may be the shortest side of the four sides of the unit pattern.

Also, by setting the size of the unit pattern on the image such that its short side has not more than 10 pixels, it is possible to arrange the unit patterns in which data is encoded, at high density, and to measure the three-dimensional shape of the target at higher resolution. Note that with regard to the size of the unit pattern on the image, its short side may also have not more than 9 pixels or not more than 8 pixels.

In short, the image captured by the image capturing unit 30 of the three-dimensional measurement apparatus 10 according to the present embodiment may be an image obtained by projecting, onto a target, a pattern including a plurality of unit patterns that each are a quadrangle with a short side of at least 3 pixels and not more than 10 pixels on the image.

The inventors found that if the contrast of the pattern decreases due to the influence of ambient light or the like, or if the pattern distorts due to the pattern being projected onto a slant surface of the target, for example, it is difficult to measure the three-dimensional shape of the target by simply miniaturizing the pattern by increasing the density of the unit patterns that are arranged. That is, simply miniaturizing the pattern will impair the robustness against a change in image capturing conditions. To address this, the inventors studied the robustness against a change in the image capturing conditions by changing the shapes of the first region and the second region included in the unit patterns. The inventors then found that if the area ratio obtained by dividing the area of the first region by the area of the second region is at least 0.3 and not more than 0.9, even if the image capturing conditions have changed, it is possible to extract feature points from the unit patterns and to decode data expressed by the unit patterns. Herein, the area ratio obtained by dividing the area of the first region included in the unit pattern by the area of the second region may be at least 0.3 and not more than 0.9 in the pattern projected by the light projecting unit 20, but may also be at least 0.3 and not more than 0.9 on the image captured by the image capturing unit 30. Note that even if the area ratio obtained by dividing the area of the first region by the area of the second region is slightly out of the range of at least 0.3 and not more than 0.9 due to noise being added to the first region or the second region in the pattern that is projected by the light projecting unit 20, if the area ratio obtained by dividing the area of the first region by the area of the second region is at least 0.3 and not more than 0.9 on the image captured by the image capturing unit 30, even if the image capturing conditions have changed, it is possible to extract feature points from the unit patterns and decode data expressed by the unit patterns. Herein, noise may also refer to the second region included in the first region of the projected pattern, and may be a minute second region to such an extent that it is not recognized as one pixel on the captured image. Also, it may be the reverse, that is, noise refers to the first region included in the second region of the projected pattern, or may be a minute first region to such an extent that it is not recognized as one pixel on the captured image.

According to the three-dimensional measurement apparatus 10 according to the present embodiment, the area ratio between the first region and the second region that are included in the unit pattern is at least 0.3 and not more than 0.9, and the unit pattern is a quadrangle with a short side of at least 3 pixels on the image, and thus, even if the image capturing conditions have changed, it is possible to identify the first region and the second region, to extract the feature points of the unit pattern, and to decode data expressed by the unit pattern. Also, the area ratio between the first region and the second region that are included in the unit pattern is at least 0.3 and not more than 0.9, and the unit pattern is a quadrangle with a short side of not more than 10 pixels on the image, and thus the two-dimensional structure in which data is encoded can be arranged at high density, and the density of the feature points that are extracted and the amount of data that is encoded can be increased. Thus, it is possible to measure a three-dimensional shape of a target at higher resolution while increasing the robustness against a change in the image capturing conditions.

§ 2 Configuration Example

Functional Configuration
Light Projecting Unit

The light projecting unit 20 projects, onto a target, a pattern in which data is encoded with a two-dimensional structure, and any pattern can be projected. Specific examples of the pattern will be described below in detail with reference to FIG. 3, for example.

The pattern that is projected by the light projecting unit 20 may be such that a plurality of quadrilateral unit patterns are arranged, and the unit patterns may include the first region and the second region. Herein, the first region and the second region may be distinguished by brightness and darkness of the light projected by the light projecting unit 20. For example, the first region may be defined as a bright region irradiated with light, and the second region may be defined as a dark region that is not irradiated with light, or they may also be reversed. By distinguishing the first region and the second region by brightness and darkness of the light, even an image capturing unit 30 configured to capture a monochromatic image can identify its pattern, and the cost of the three-dimensional measurement apparatus 10 can be reduced by simplifying the configuration of the image capturing unit 30.

Also, the first region and the second region of the unit pattern may be distinguished by the wavelength bands of the light projected by the light projecting unit 20. For example, the first region may be defined as a region irradiated with blue light having a wavelength of about 450 nm, and the second region may be defined as a region irradiated with red light having a wavelength of about 650 nm, or they may also be reversed. As another example, the first region may be defined as a region irradiated with blue light having a wavelength of about 450 nm, and the second region may be defined as a region irradiated with yellow light having a wavelength of about 580 nm, or they may also be reversed. As still another example, the first region may be defined as a region irradiated with blue light having a wavelength of about 450 nm, and the second region may be defined as a region irradiated with infrared rays having a wavelength of about 1 µm, or they may also be reversed. By distinguishing the first region and the second region by wavelength bands of the light in this manner, even if the target is irradiated with white light such as ambient light, a difference between the first region and the second region is unlikely to vary, and the first region and the second region can be easily identified. Note that the first region and the second region may also be identified by selecting a combination of wavelength bands such that the first region and the second region of the unit pattern have a significant difference depending on the absorbance of the target. Also, the first region and the second region may be identified by selecting a combination of wavelength bands such that the first region and the second region of the unit pattern have a significant difference depending on the spectral sensitivity of the image sensor of the image capturing unit 30.

Also, the first region and the second region of the unit pattern may be distinguished by the polarization of the light projected by the light projecting unit 20. For example, the first region may be defined as a region irradiated with light that is linearly polarized in a first direction, and the second region may be defined as a region irradiated with light that is linearly polarized in a second direction that is orthogonal to the first direction, or they may also be reversed. Also, as another example, the first region may be defined as a region irradiated with light that is circularly polarized clockwise with respect to a direction in which light travels, and the second region may be defined as a region irradiated with light that is circularly polarized counterclockwise with respect to the direction in which light travels, or they may also be reversed. Note that the first region and the second region may also be identified by selecting a combination of polarizations such that the first region and the second region of the unit pattern have a significant difference depending on the absorbance of polarized light by the target. By distinguishing the first region and the second region by polarization of the light, even if a target such as a black target or a transparent target is irradiated with light such as ambient light, a difference between the first region and the second region is unlikely to vary, and the first region and the second region can be easily identified.

The light projecting unit 20 may also be a projector configured to project any fixed pattern, or a projector configured to project one fixed pattern per unit time using a MEMS (Micro Electro-Mechanical Systems), for example. The light projecting unit 20 may also include a modulation element configured to modulate the size of a pattern to be projected, or modify a size of a pattern to be projected depending on the unevenness or inclination of the target, for example. The robustness against a change in the image capturing conditions can be ensured by modulating the size of the pattern according to the state of the target. Also, by increasing the number of pixels of a short side on the image through modulation such that the size of the pattern increases, it is possible to reduce the number of three-dimensional point groups and to reduce the calculation load of image recognition for measuring the three-dimensional shape of the target.

Image Capturing Unit

The image capturing unit 30 captures an image of a target onto which a pattern is projected, may output the captured image to the controller 40 or another device. The image capturing unit 30 may be disposed at a predetermined distance and a predetermined angle with respect to the light projecting unit 20, and the direction in which the light projecting unit 20 projects light and the direction in which the image capturing unit 30 captures an image may be approximately the same, and the image capturing unit 30 and the light projecting unit 20 may be disposed on the same plane at a predetermined distance.

Controller

The controller 40 includes an image input unit 41, an image recording unit 42, a calculation unit 43, a three-dimensional point group output unit 44, and a setting unit 45. The image input unit 41 acquires the image captured by the image capturing unit 30 from the image capturing unit 30, and inputs the acquired image to the image recording unit 42. The image recording unit 42 records the image captured by the image capturing unit 30 in a memory.

The calculation unit 43 extracts feature points of the captured pattern. The calculation unit 43 may extract a feature point of each of the unit patterns included in the pattern, and may extract the centers of the unit patterns as feature points, for example. Also, the calculation unit 43 decodes data expressed by the unit pattern based on two-dimensional shapes of the first region and the second region that are included in the unit pattern. The calculation unit 43 then calculates the positions of the three-dimensional point group expressing the three-dimensional shape of the target based on the positions of the feature points in the image and the decoded data. More specifically, with regard to a unit pattern of interest and a unit pattern that is adjacent to the unit pattern of interest, data expressed by the unit patterns is decoded, and a row to which the unit pattern of interest belongs is specified from the order in which the data is arranged. The distance to the target is then calculated by triangulation based on the positions of the feature points on the image that were extracted from the unit pattern of interest and the specified row. Note that the calculation unit 43 may also specify not only the row to which the unit pattern of interest belongs but also a column to which the unit pattern of interest belongs, using an epipolar constraint. In this manner, it is possible to calculate the positions of a plurality of points expressing the three-dimensional shape of the target for the plurality of the unit patterns, and to express the three-dimensional shape of the target.

The three-dimensional point group output unit 44 outputs the data of the calculated three-dimensional point group to the recognition unit 50. The three-dimensional point group output unit 44 may also output the data on the three-dimensional point group to a display unit or an apparatus other than the three-dimensional measurement apparatus 10.

The setting unit 45 may set a pattern that is projected by the light projecting unit 20, or may set the aperture or an exposure time of the image capturing unit 30, for example. The setting unit 45 may set a range of the area ratio between the first region and the second region of the unit pattern included in the pattern that is projected by the light projecting unit 20, in accordance with the number of pixels of a short side of the unit pattern on the image. That is, the setting unit 45 may set the area ratio between the first region and the second region to be in a range of at least 0.3 and not more than 0.9, or smaller than a range of at least 0.3 and not more than 0.9, in accordance with the number of pixels of the short side of the unit pattern on the image. By setting the range of the area ratio between the first region and the second region that are included in the unit pattern in accordance with the number of pixels of the short side of the unit pattern on the image in this manner, it is possible to set the range of the area ratio between the first region and the second region according to the density of the unit pattern on the image, and to adjust the balance between the resolution at which the three-dimensional shape of the target is measured and the robustness against a change in the image capturing conditions.

The setting unit 45 may also narrow the range of the area ratio between the first region and the second region as the number of pixels of the short side of the unit pattern on the image decreases. For example, if the number of pixels of the short side of the unit pattern on the image is 10, the area ratio between the first region and the second region is in a range of at least 0.3 and not more than 0.9, and as the number of pixels of the short side of the unit pattern on the image becomes smaller than 10, the area ratio between the first region and the second region may be set narrower than the range of at least 0.3 and not more than 0.9. Accordingly, it is possible to narrow the range of the area ratio between the first region and the second region as the density of the unit pattern on the image increases, and to narrow down the range of the area ratio between the first region and the second region to such a range that the robustness against a change in the image capturing conditions can be ensured as the resolution at which the three-dimensional shape of the target is measured increases. Thus, it is possible to adjust the balance between the resolution at which the three-dimensional shape of the target is measured and the robustness against a change in the image capturing conditions.

Recognition Unit

The recognition unit 50 includes a CAD model storage unit 51, a CAD matching calculation unit 52, and a CAD matching output unit 53. The CAD model storage unit 51 may store a three-dimensional CAD model of the target. The CAD matching calculation unit 52 may perform matching between the three-dimensional point group acquired from the three-dimensional point group output unit 44 and three-dimensional CAD models of targets stored in the CAD model storage unit 51. Matching between the three-dimensional point group and the three-dimensional CAD models may be performed using any algorithm. The CAD matching output unit 53 may output the result of matching calculated by the CAD matching calculation unit 52 to the display unit or another device.

Hardware Configuration

Light Projecting Unit

Next, an example of the hardware configuration of the three-dimensional measurement apparatus 10 according to the present embodiment will be described. The projecting unit 20 may include a light source and a photomask for generating light having a pattern, and may include a laser light source and a diffractive optical element, for example. Also, the light projecting unit 20 may be a projector including an optical element configured to form a fixed pattern and a DLP (Digital Light Processing), an LCD (Liquid Crystal Display), an LCOS (Liquid Crystal On Silicon), or a MEMS (Micro Electro-Mechanical Systems) device as a light modulation element, for example, and may also include a modulation element configured to modulate the size of the pattern to be projected. The light projecting unit 20 may allow light from the laser light source to enter the diffractive optical element, and generate light having a two-dimensional structure using a diffraction pattern formed on a surface of the diffractive optical element. Note that the light projecting unit 20 may also include an optical member such as a lens, the wavelength band of the light emitted from the light source is not limited to the visible region, and may also be a wavelength band in the infrared region or the ultraviolet region.

Image Capturing Unit

The image capturing unit 30 may be a camera including at least a light-receiving element configured to detect light projected by the light projecting unit 20. The image capturing unit 30 may include a filter for separating wavelength and a filter for separating polarized light, and an optical member such as a lens.

Controller and Recognition Unit

Figure 2:
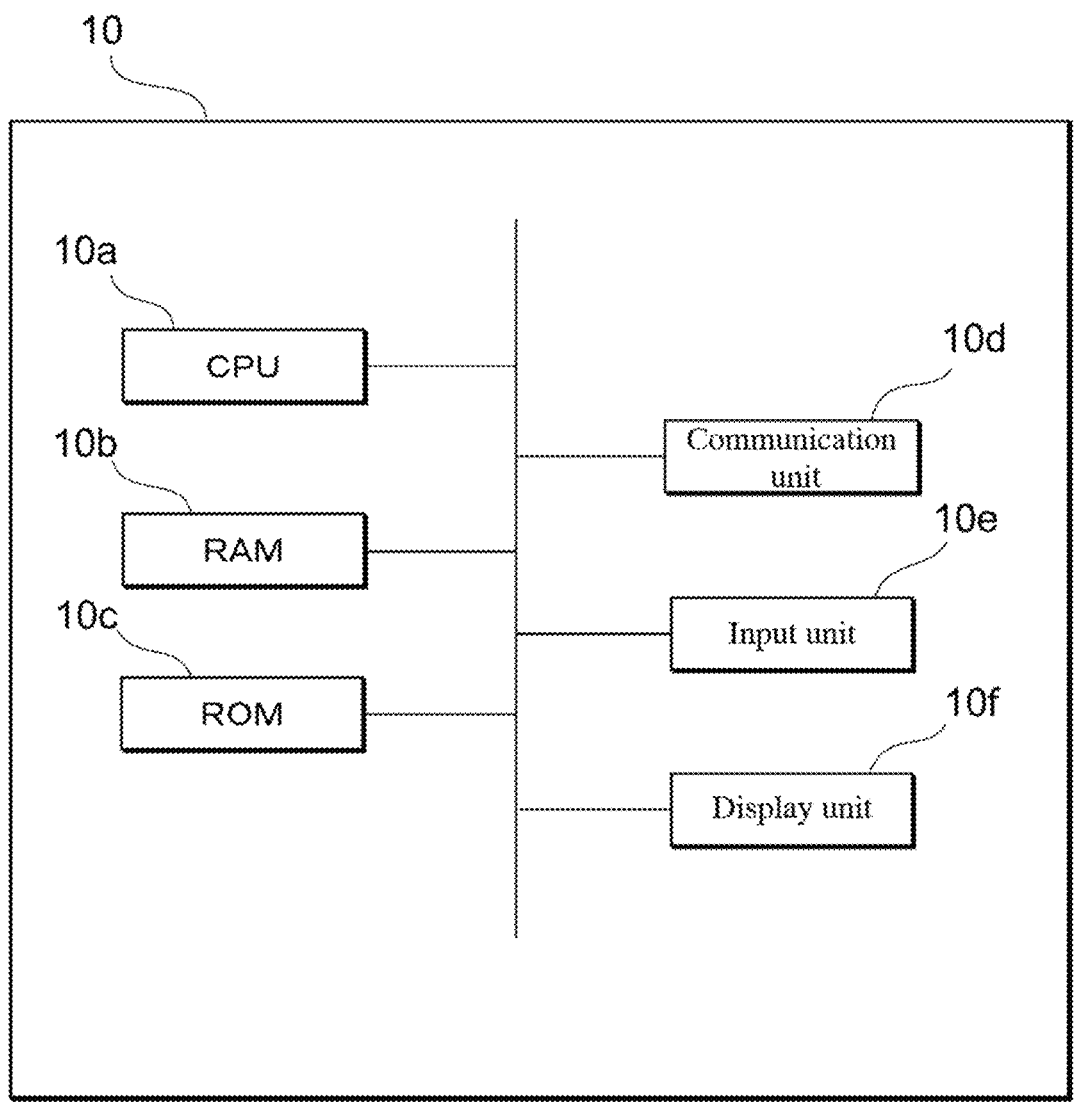
FIG. 2 is a diagram showing a physical configuration of a controller and a recognition unit of the three-dimensional measurement apparatus according to this embodiment.

FIG. 2 is a diagram showing a physical configuration of the controller 40 and the recognition unit 50 of the three-dimensional measurement apparatus 10 according to the present embodiment. The three-dimensional measurement apparatus 10 has a CPU (Central Processing Unit) 10a corresponding to an arithmetic unit, a RAM (Random Access Memory) 10b corresponding to a storage unit, a ROM (Read only Memory) 10c corresponding to a storage unit, a communication unit 10d, an input unit 10e, and a display unit 10f. These elements are connected via a bus so as to be capable of transmitting and receiving data mutually. Although the case where the three-dimensional measurement apparatus 10 is constituted by one computer will be described in this example, the three-dimensional measurement apparatus 10 may also be realized by using a plurality of computers.

The CPU 10a is a control unit configured to perform control related to execution of programs stored in the RAM 10b or the ROM 10c, calculate and process data. The CPU 10a is an arithmetic unit configured to calculate the positions of the three-dimensional point group expressing the three-dimensional shape of the target based on the image of the target onto which the pattern is projected, and execute a program (three-dimensional measurement program) for performing matching between the three-dimensional point group and the three-dimensional CAD models. The CPU 10a receives various input data from the input unit 10e and the communication unit 10d, displays the result of calculating the input data on the display unit 10f, and stores the input data in the RAM 10b or the ROM 10c. Note that although not shown in FIG. 2, machine learning calculation related to measurement of the three-dimensional shape may also be performed using a unit configured to perform parallel processing, for example an ASIC (Application Specific Integrated Circuit) such as a GPU (Graphical Processing Unit) or a TPU (Tensor Processing Unit).

The RAM 10b is a rewritable storage unit, and may be constituted by a semiconductor memory device, for example. The RAM 10b may store a three-dimensional measurement program executed by the CPU 10a, an image of the target acquired from the image capturing unit 30, data related to the calculated three-dimensional point group, and data such as the three-dimensional CAD model of the target. Note that these are examples, and data other than the above may also be stored in the RAM 10b, and some of this data may not be stored.

The ROM 10c is a data readable storage unit, and may be constituted by a semiconductor memory device, for example. The ROM 10c may store a three-dimensional measurement program and data that is not rewritten, for example.

The communication unit 10d is an interface that connects the three-dimensional measurement apparatus 10 to another device. The communication unit 10d may be connected to the light projecting unit 20 and the image capturing unit 30 by a LAN (Local Area Network), for example, and may transmit information related to settings of the pattern to the light projecting unit 20 and transmit information related to settings such as the aperture, an exposure time, or a shutter speed to the image capturing unit 30. Also, the communication unit 10d may receive the image of the target from the image capturing unit 30. Also, the communication unit 10d may be connected to a communication network such as the Internet. Furthermore, a projection time of the light projecting unit 20, the light modulation element of the light projecting unit 20, the exposure time and the shutter speed of the image capturing unit 30 may also be controlled by an FPGA (Field-Programmable Gate Array).

The input unit 10e receives data input by a user and may also include a keyboard, a mouse, and a touch panel, for example.

The display unit 10f visually displays the result of calculation performed by the CPU 10a, and may also be constituted by an LCD (Liquid Crystal Display), for example. The display unit 10f may display the image of the target captured by the image capturing unit 30, the calculated three-dimensional point group, or the three-dimensional CAD model that was matched with the three-dimensional point group.

The three-dimensional measurement program may be provided in a state of being stored in a computer-readable storage medium such as the RAM 10b or the ROM 10c, or may also be provided through a communication network that is connected by the communication unit 10d. In the three-dimensional measurement apparatus 10, various operations that were described with reference to FIG. 1 are realized by the CPU 10a executing the three-dimensional measurement program. Note that these physical configurations are merely examples, and do not necessarily have to be independent from each other. For example, the three-dimensional measurement apparatus 10 may also include an LSI (Large-Scale Integration) chip in which the CPU 10a, the RAM 10b, and the ROM 10c are integrated together.

§ 3 Operation Example

Figure 3:
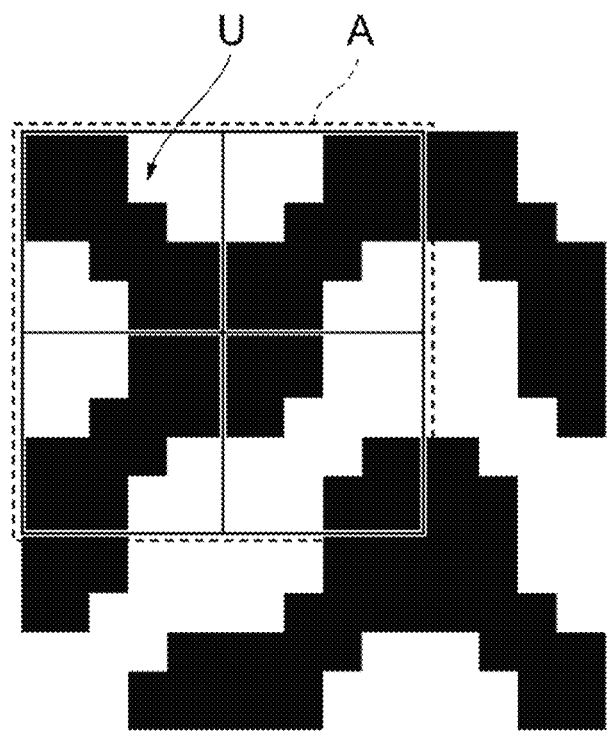
FIG. 3 is a diagram showing one example of a pattern projected by a light projecting unit of the three-dimensional measurement apparatus according to this embodiment.

FIG. 3 is a diagram showing one example of a pattern projected by the light projecting unit 20 of the three-dimensional measurement apparatus 10 according to the present embodiment. FIG. 3 shows an enlarged portion of the pattern projected by the light projecting unit 20. The pattern projected by the light projecting unit 20 includes unit patterns U that are arranged in an N×M (N and M are natural numbers) grid shape, and includes encoded regions A in which the unit patterns U that are arranged in an n×m (n is a natural number that is smaller than N, and m is a natural number that is smaller than M) grid shape are united. In the pattern of this example, the unit patterns U arranged in a 2×2 grid shape are united to constitute one encoded region A, and one piece of data is decoded from one encoded region A. Adjacent encoded regions A may also include unit patterns U in an overlapping manner.

Figure 4:
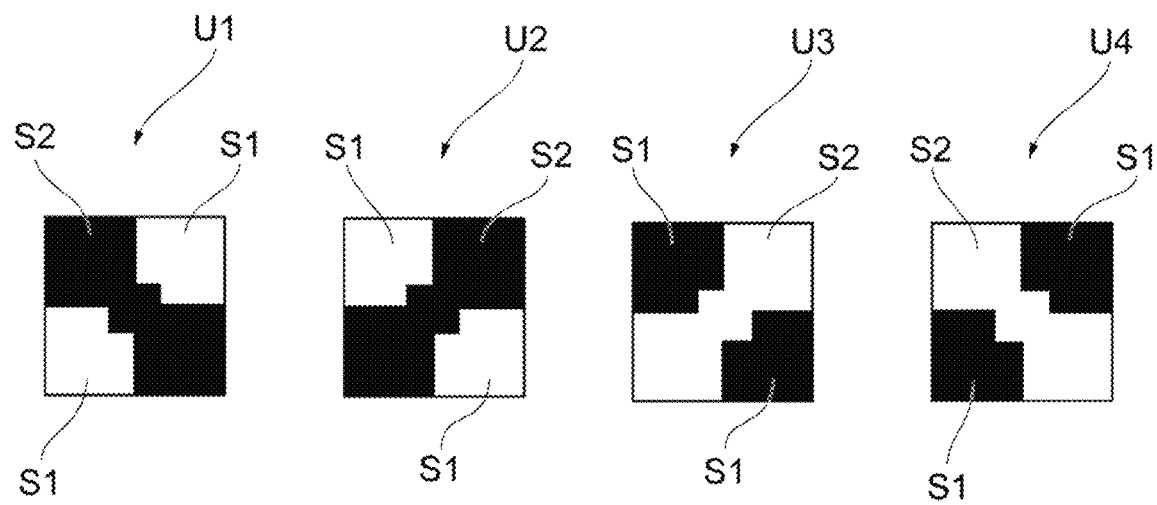
FIG. 4 is a diagram showing examples of unit patterns projected by the light projecting unit of the three-dimensional measurement apparatus according to this embodiment.

FIG. 4 is a diagram showing examples unit patterns projected by the light projecting unit 20 of the three-dimensional measurement apparatus 10 according to the present embodiment. FIG. 4 shows a first unit pattern U1, a second unit pattern U2, a third unit pattern U3, and a fourth unit pattern U4. The first unit pattern U1, the second unit pattern U2, the third unit pattern U3, and the fourth unit pattern U4 are patterns that each include first regions S1 and a second region S2, and each have a two-dimensional structure in which one relatively small square is disposed at the center of a grid pattern constituted by a relatively large square.

The first unit pattern U1 includes white first regions S1 at its lower left and its upper right, and a black second region S2 extending from its upper left to its lower right. The second unit pattern U2 includes white first regions S1 at its upper left and its lower right, and a black second region S2 extending from its lower left to its upper right. The third unit pattern U3 includes black first regions S1 at its upper left and its lower right, and a white second region S2 extending from its lower left to its upper right. The fourth unit pattern U4 includes black first regions S1 at its lower left and its upper right, and a white second region S2 extending from its upper left to its lower right.

Herein, a region indicated by white may be a bright region irradiated with light, and a region indicated by black may be a dark region that is not irradiated with light. As a matter of course, the region indicated by white may also be a dark region that is not irradiated with light, and the region indicated by black may also be a bright region irradiated with light. Also, the region indicated by white may also be a region irradiated with blue light, the region indicated by black may also be a region irradiated with red light, the region indicated by white may also be a region irradiated with light that is linearly polarized in a first direction, and the region indicated by black may also be a region irradiated with light that is linearly polarized in a second direction that is orthogonal to the first direction, for example.

The first unit pattern U1, the second unit pattern U2, the third unit pattern U3, and the fourth unit pattern U4 include a two-dimensional shape in which the first regions S1 are separate from each other while flanking the second region S2. Also, the first unit pattern U1 and the second unit pattern U2 have shapes that are rotated by 90 degrees relative to each other, the third unit pattern U3 and the fourth unit pattern U4 have shapes that are rotated by 90 degrees relative to each other, the first unit pattern U1 and the fourth unit pattern U4 have shapes in which their white and black are inverted, and the second pattern U2 and the third unit pattern U3 have shapes in which their white and black are inverted.

Because the first regions S1 are separate from each other while flanking the second region S2, it is possible to constitute various two-dimensional structures by unit patterns, and to increase the density of data encoded by the unit pattern. This makes it possible to reduce the number of unit patterns that need to be decoded in order to specify a row of the pattern, to perform matching between the pattern on the image and the projected pattern through less computation, and to reduce a calculation load of image recognition for measuring the three-dimensional shape of the target.

Also, the first regions S1 are separate from each other while flanking the second region S2 in the first unit pattern U1, the second unit pattern U2, the third unit pattern U3, and the fourth unit pattern U4. In other words, the first regions S1 are separate from each other while flanking the second region S2 in the first unit pattern U1, the second unit pattern U2, the third unit pattern U3, and the fourth unit pattern U4, but are not separated (divided) into at least three regions while flanking the second region S2. Reducing the number of separations of the first region S1 to two makes it possible to make the two-dimensional structure of the unit pattern relatively simple and to facilitate identifying the first regions S1 and the second region S2. Also, it is possible to increase the amount of data that can be expressed by the unit pattern, and to increase the density of data encoded by the pattern. Thus, it is possible to reduce the number of unit patterns that need to be decoded in order to specify a row of the pattern, to perform matching between the pattern on the image and the projected pattern through less computation, and to reduce a calculation load of image recognition for measuring the three-dimensional shape of the target.

Figure 5:
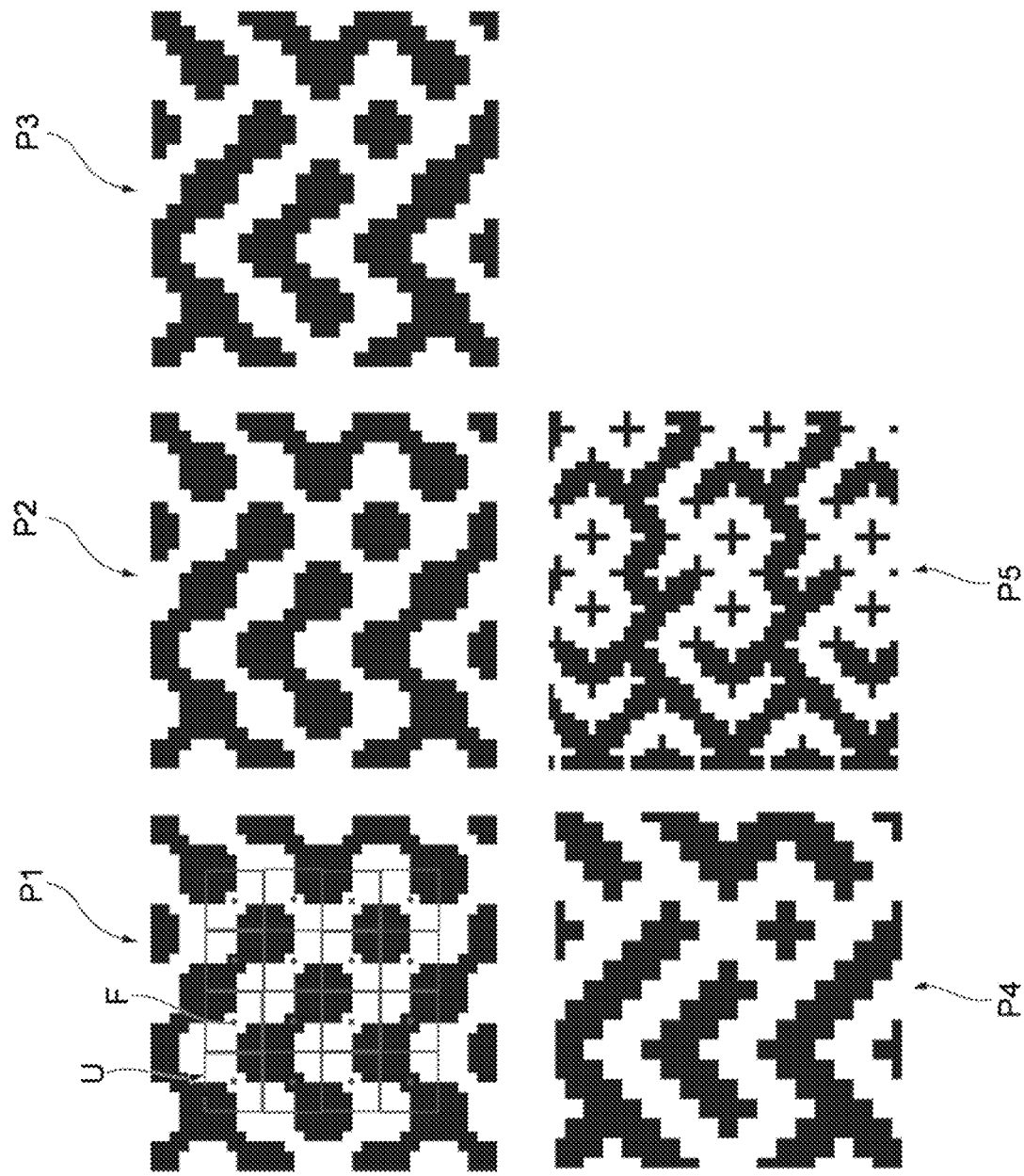
FIG. 5 is a diagram showing examples of patterns with different area ratios between a first region and a second region, the patterns being projected by the light projecting unit of the three-dimensional measurement apparatus according to this embodiment.

FIG. 5 is a diagram showing examples of patterns that are projected by the light projecting unit 20 of the three-dimensional measurement apparatus 10 according to the present embodiment, the patterns having different area ratios between the first region and the second region. FIG. 5 shows a first pattern P1, a second pattern P2, a third pattern P3, a fourth pattern P4, and a fifth pattern P5 that include the first unit patterns U1, the second unit patterns U2, the third unit patterns U3, and the fourth unit patterns U4 that are shown in FIG. 4, the first pattern P1, the second pattern P2, the third pattern P3, the fourth pattern P4, and the fifth pattern P5 having different area ratios between the first region and the second region without changing the length of four sides of each of the unit patterns. Note that the outer shape of the unit pattern is a square in this example, and the lengths of the four sides of the unit pattern are equal to each other. Also, with regard to the first pattern P1, the unit pattern U and feature points F extracted from the unit pattern U are shown. Note that the first pattern P1, the second pattern P2, the third pattern P3, the fourth pattern P4, and the fifth pattern P5 are enlarged portions of the patterns. Also, although the unit pattern U and the feature points F of the first pattern P1 are shown, similarly, the second pattern P2, the third pattern P3, the fourth pattern P4, and the fifth pattern P5 include the unit patterns, and their feature points are extracted from the unit patterns.

The first pattern P1 is an example in which the area ratio obtained by dividing the area of the first region included in the unit pattern U by the area of the second region is $4/5=0.8$. The second pattern P2 is an example in which the area ratio obtained by dividing the area of the first region included in the unit pattern by the area of the second region is $21/29 \approx 0.724$. The third pattern P3 is an example in which the area ratio obtained by dividing the area of the first region included in the unit pattern by the area of the second region is $3/5=0.6$. The fourth pattern P4 is an example in which the area ratio obtained by dividing the area of the first region included in the unit pattern by the area of the second region is $5/13=0.385$. The fifth pattern P5 is an example in which the area ratio obtained by dividing the area of the first region included in the unit pattern by the area of the second region is 0.2.

FIG. 6 is a diagram showing examples of patterns that are disordered by a change in image capturing conditions. FIG. 6 shows examples of patterns in which changes in the image capturing conditions are reproduced by changing the contrast of an image, adding noise to the image, smoothing the image, and subjecting the image to affine transformation when the length of a short side of a unit pattern is 4 pixels, 5 pixels, or 6 pixels on the image. Herein, affine transformation includes enlargement, reduction, and shear deformation of an image in a specific direction. Note that FIG. 6 shows examples of a pattern in which the area ratio obtained by dividing the area of the first region included in the unit pattern by the area of the second region is $3/5=0.6$.

The first row of FIG. 6 that indicates "No change" shows examples of patterns when the length of a short side of a unit pattern is 4 pixels, 5 pixels, or 6 pixels on the image and the image capturing conditions have no change. The patterns shown in the first row include the four types of unit pattern shown in FIG. 4.

The second row of FIG. 6 that indicates "First condition" shows examples of patterns when the length of a short side of a unit pattern is 4 pixels, 5 pixels, or 6 pixels on the image and the image capturing conditions are changed under the first condition. Herein, the first condition is a condition under which the contrast is reduced such that M−L=30 holds true where the brightness of the brightest pixel is M and the brightness of the darkest pixel is L. It can be seen from the patterns shown in the second row that it becomes more difficult to identify the first region and the second region than in the case of "No change" shown in the first row, due to the image being disordered under the first condition.

The third row of FIG. 6 that indicates "Second condition" shows examples of patterns when the length of a short side of a unit pattern is 4 pixels, 5 pixels, or 6 pixels on the image and the image capturing conditions are changed under the second condition. Herein, the second condition is a condition under which the contrast is reduced such that M−L=30 holds true where the brightness of the brightest pixel is M and the brightness of the darkest pixel is L, noise is added to the image based on a Gaussian distribution with a standard deviation of 5, and the image is smoothed based on a Gaussian distribution with a standard deviation of 1. It can be seen from the patterns shown in the third row that it becomes more difficult to identify the first region and the second region than in the case of "No change" shown in the first row, due to the image being disordered under the second condition.

The fourth row of FIG. 6 that indicates "Third condition" shows examples of patterns when the length of a short side of a unit pattern is 4 pixels, 5 pixels, or 6 pixels on the image and the image capturing conditions are changed under the third condition. Herein, the third condition is a condition under which noise is added to the image based on a Gaussian distribution with a standard deviation of 5, the image is smoothed based on a Gaussian distribution with a standard deviation of 1, the image is enlarged by 20% in the X-axis direction, and shear deformation is performed at 30 degrees in a direction in which the pattern extends. It can be seen from the patterns shown in the fourth row that it becomes more difficult to identify the first region and the second region than in the case of "No change" shown in the first row, due to the image being disordered under the third condition.

The fifth row of FIG. 6 that indicates "Fourth condition" shows examples of patterns when the length of a short side of a unit pattern is 4 pixels, 5 pixels, or 6 pixels on the image and the image capturing conditions are changed under the fourth condition. Herein, the fourth condition is a condition under which noise is added to the image based on a Gaussian distribution with a standard deviation of 5, the image is smoothed based on a Gaussian distribution with a standard deviation of 1, the image is reduced by 20% in the X-axis direction, and shear deformation is performed at 30 degrees in a direction in which the patter shrinks. It can be seen from the patterns shown in the fifth row that it becomes more difficult to identify the first region and the second region than in the case of "No change" shown in the first row, due to the image being disordered under the fourth condition.

Figure 7:
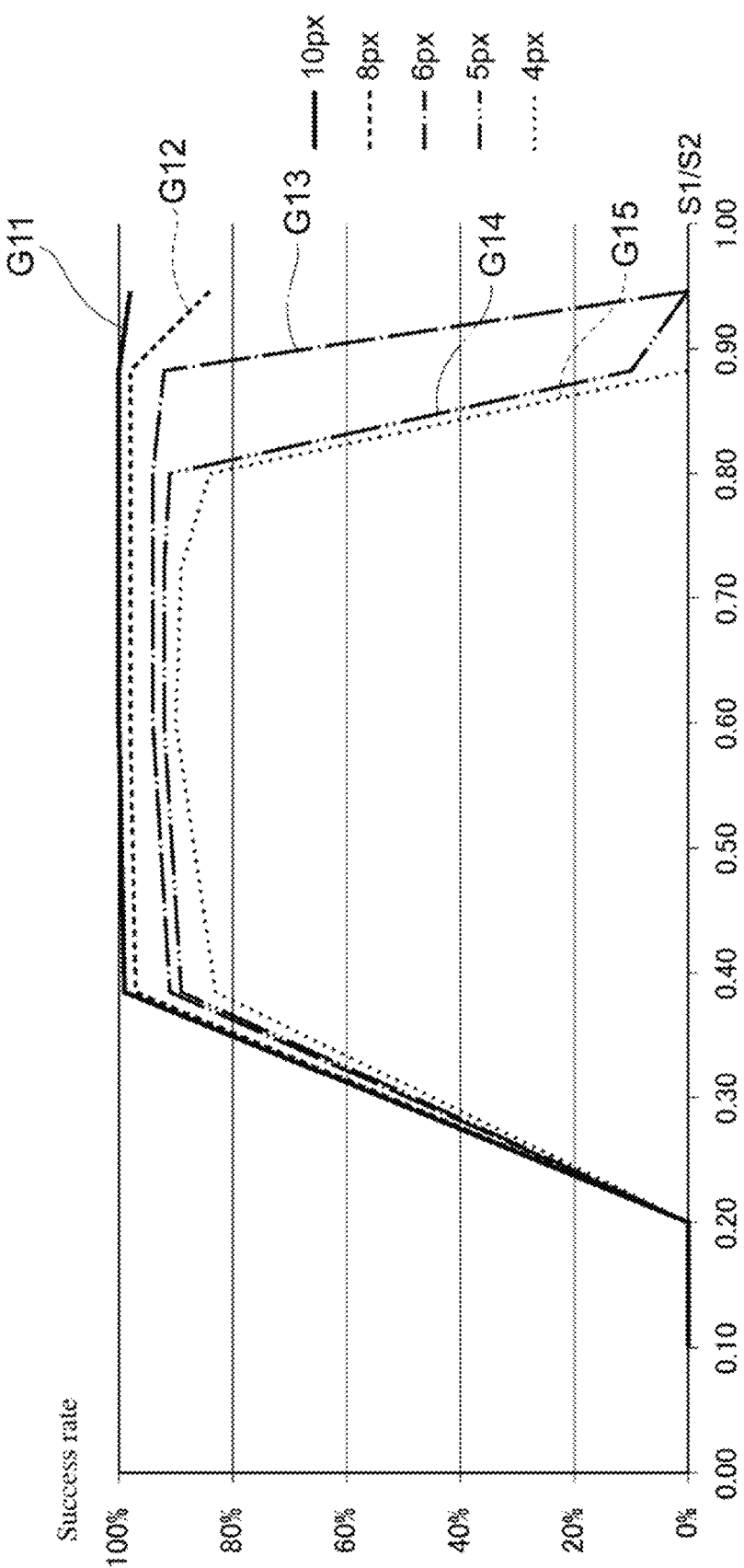
FIG. 7 is a graph showing the relationship between the area ratio between the first region and the second region of a pattern that was disordered in a first mode and a success rate when data is decoded from this pattern.

FIG. 7 is a graph showing the relationship between the area ratio between the first region and the second region of the pattern that was disordered in the first mode and a success rate when data is decoded from this pattern. In FIG. 7, the case where the length of a short side of a unit pattern is 10 pixels on the image is indicated by a solid-line graph G11, the case where the length of a short side of a unit pattern is 8 pixels on the image is indicated by a broken-line graph G12, the case where the length of a short side of a unit pattern is 6 pixels on the image is indicated by a chain-line graph G13, the case where the length of a short side of a unit pattern is 5 pixels on the image is indicated by a chain double-dashed line graph G14, and the case where the length of a short side of a unit pattern is 4 pixels on the image is indicated by a dotted-line graph G15.

The pattern that was disordered in the first mode is a pattern obtained by reducing the contrast such that M−L=30 holds true where the brightness of the brightest pixel is M and the brightness of the darkest pixel is L, adding noise to the image based on a Gaussian distribution with a standard deviation of 5, and smoothing the image based on a Gaussian distribution with a standard deviation of 1. That is, the pattern that was disordered in the first mode is a pattern that reproduces the case where the contrast of the image decreases due to ambient light or the like, noise is added to the image sensor of the image capturing unit 30, and thereby the image is disordered.

According to the graphs G11 to G15, it can be seen that even if the length of the short side of the unit pattern is any one of 4 pixels to 10 pixels, when the area ratio between the first region and the second region of the unit pattern is 0.3, the success rate of decoding is at least 50%. Also, it can be seen that even if the length of the short side of the unit pattern is any one of 4 pixels to 10 pixels, when the area ratio between the first region and the second region of the unit pattern is in a range of 0.4 to 0.8, the success rate of decoding is at least 80%. Also, it can be seen that even if the length of the short side of the unit pattern is any one of 6 pixels to 10 pixels, when the area ratio between the first region and the second region of the unit pattern is in a range of 0.4 to 0.9, the success rate of decoding is at least 90%.

If the length of the short side of the unit pattern is in a range of 6 pixels to 10 pixels, for example, the setting unit 45 may also set the range of the area ratio between the first region and the second region of the unit pattern to about 0.4 to 0.9, and if the length of the short side of the unit pattern is 4 pixels or 5 pixels, the setting unit 45 may also narrow the range of the area ratio between the first region and the second region of the unit pattern to about 0.4 to 0.8.

The area ratio between the first region and the second region that are included in the unit pattern is at least 0.3 and not more than 0.9, and the unit pattern is a quadrangle with a short side of at least 3 pixels and not more than 10 pixels on the image, and thus, even if the contrast of the image decreases due to ambient light or the like and noise is added to the image sensor of the image capturing unit 30, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

Figure 8:
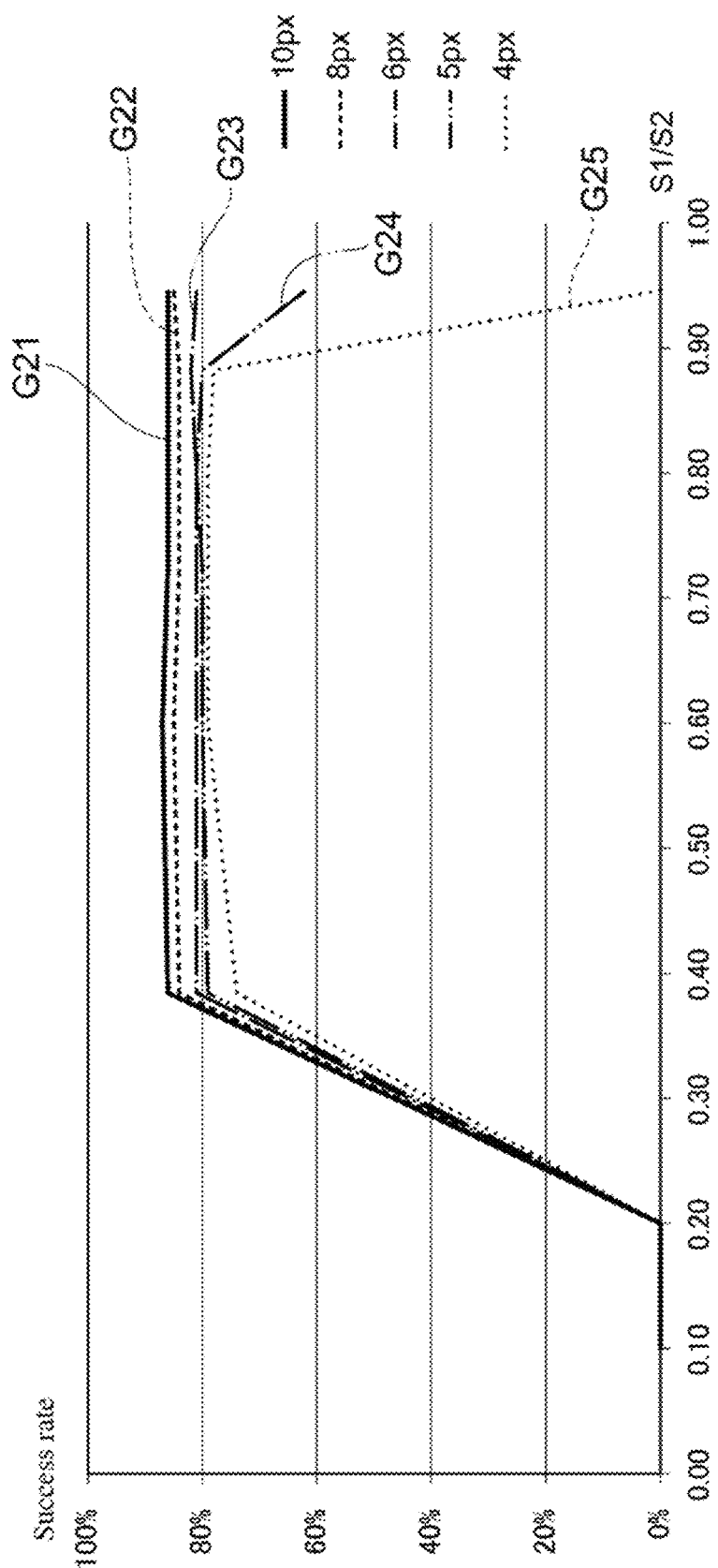
FIG. 8 is a graph showing the relationship between the area ratio between the first region and the second region of a pattern that was disordered in a second mode and a success rate when data is decoded from this pattern.

FIG. 8 is a graph showing the relationship between the area ratio between the first region and the second region of the pattern that was disordered in the second mode and a success rate when data is decoded from this pattern. In FIG. 8, the case where the length of a short side of a unit pattern is 10 pixels on the image is indicated by a solid-line graph G21, the case where the length of a short side of a unit pattern is 8 pixels on the image is indicated by a broken-line graph G22, the case where the length of a short side of a unit pattern is 6 pixels on the image is indicated by a chain-line graph G23, the case where the length of a short side of a unit pattern is 5 pixels on the image is indicated by a chain double-dashed line graph G24, and the case where the length of a short side of a unit pattern is 4 pixels on the image is indicated by a dotted-line graph G25.

The pattern that was disordered in the second mode is a pattern that reproduces the case where noise is added to the image based on a Gaussian distribution with a standard deviation of 5, the image is smoothed based on a Gaussian distribution with a standard deviation of 1, the image is enlarged by 20% in the X-axis direction, shear deformation is performed at 20 degrees in the direction in which the pattern extends, and thereby the image is disordered. That is, the pattern that was disordered in the second mode is a pattern that reproduces the case where the contrast of the image decreases due to ambient light or the like, noise is added to the image sensor of the image capturing unit 30, the pattern distorts due to the pattern being projected onto a slant surface of the target or the background, and thereby the image is disordered.

According to the graphs G21 to G25, it can be seen that even if the length of the short side of the unit pattern is any one of 4 pixels to 10 pixels, when the area ratio between the first region and the second region of the unit pattern is 0.3, the success rate of decoding is at least 50%. Also, it can be seen that even if the length of the short side of the unit pattern is any one of 4 pixels to 10 pixels, when the area ratio between the first region and the second region of the unit pattern is in a range of about 0.4 to 0.9, the success rate of decoding is at least 70%. Also, it can be seen that even if the length of the short side of the unit pattern is any one of 5 pixels to 10 pixels, when the area ratio between the first region and the second region of the unit pattern is in a range of about 0.4 to 0.9, the success rate of decoding is at least 80%.

The area ratio between the first region and the second region that are included in the unit pattern is at least 0.3 and not more than 0.9 and the unit pattern is a quadrangle with a short side of at least 3 pixels and not more than 10 pixels on the image in this manner, and thus, even if the contrast of the image decreases due to ambient light or the like, noise is added to the image sensor of the image capturing unit 30, and the pattern distorts due to the pattern being projected onto the slant surface of the target or the background, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

Figure 9:
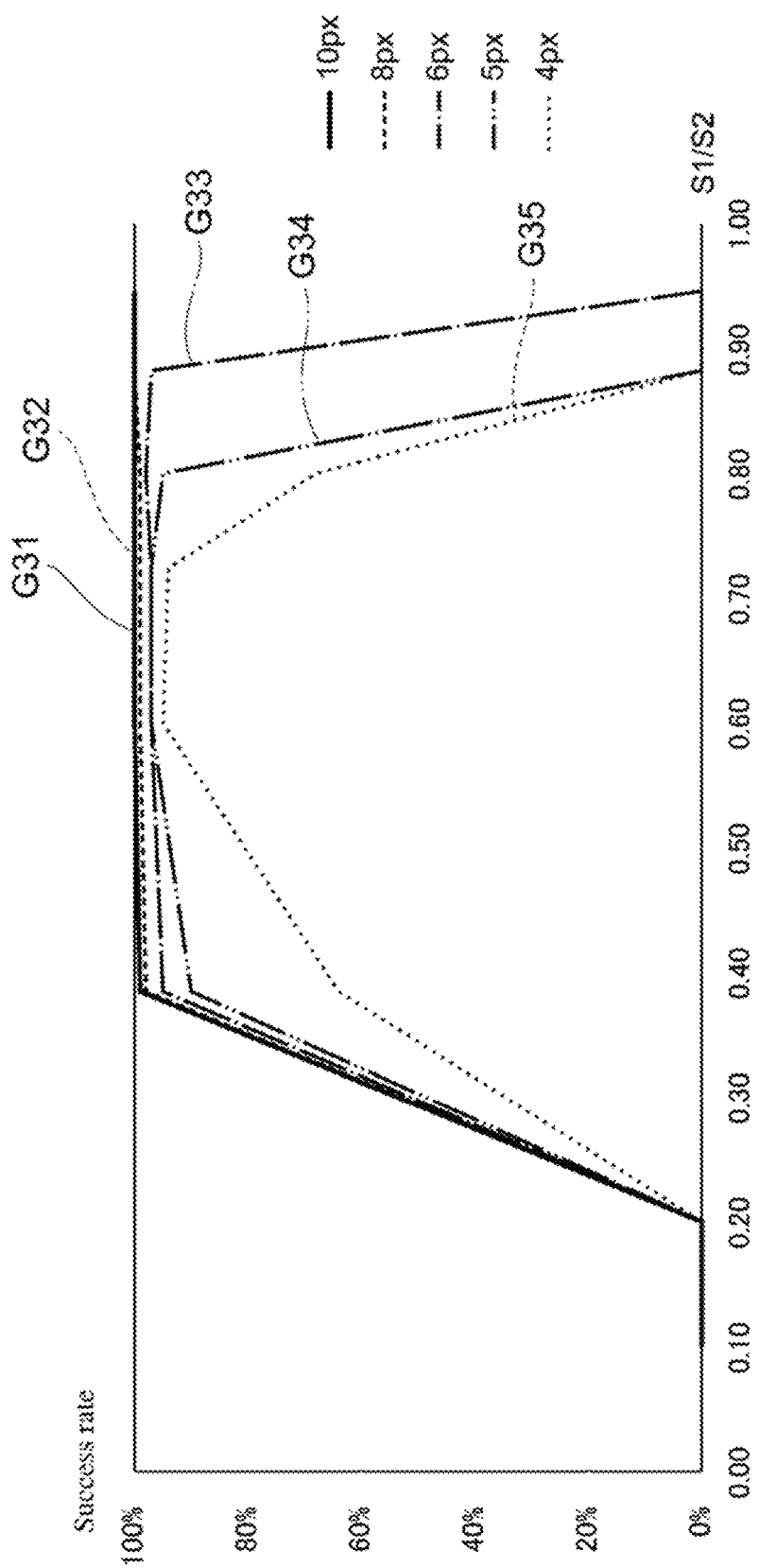
FIG. 9 is a graph showing the relationship between the area ratio between the first region and the second region of a pattern that was disordered in a third mode and a success rate when data is decoded from this pattern.

FIG. 9 is a graph showing the relationship between the area ratio between the first region and the second region of the pattern that was disordered in the third mode and a success rate when data is decoded from this pattern. In FIG. 9, the case where the length of a short side of a unit pattern is 10 pixels on the image is indicated by a solid-line graph G31, the case where the length of a short side of a unit pattern is 8 pixels on the image is indicated by a broken-line graph G32, the case where the length of a short side of a unit pattern is 6 pixels on the image is indicated by a chain-line graph G33, the case where the length of a short side of a unit pattern is 5 pixels on the image is indicated by a chain double-dashed line graph G34, and the case where the length of a short side of a unit pattern is 4 pixels on the image is indicated by a dotted-line graph G35.

The pattern that was disordered in the third mode is a pattern that reproduces the case where noise is added to the image based on a Gaussian distribution with a standard deviation of 5, the image is smoothed based on a Gaussian distribution with a standard deviation of 1, the image is reduced by 20% in the X-axis direction, shear deformation is performed at 20 degrees in the direction in which the pattern shrinks, and thereby the image is disordered. That is, the pattern that was disordered in the third mode is a pattern that reproduces the case where the contrast of the image decreases due to ambient light or the like, noise is added to the image sensor of the image capturing unit 30, the pattern distorts due to the pattern being projected onto a slant surface of the target or the background, and thereby the image is disordered.

According to the graphs G31 to G35, it can be seen that even if the length of the short side of the unit pattern is any one of 4 pixels to 10 pixels, when the area ratio between the first region and the second region of the unit pattern is 0.35, the success rate of decoding is at least 50%. Also, it can be seen that even if the length of the short side of the unit pattern is any one of 4 pixels to 10 pixels, when the area ratio between the first region and the second region of the unit pattern is in a range of about 0.6 to 0.7, the success rate of decoding is at least 90%. Also, it can be seen that even if the length of the short side of the unit pattern is any one of 5 pixels to 10 pixels, when the area ratio between the first region and the second region of the unit pattern is in a range of about 0.4 to 0.8, the success rate of decoding is at least 90%.

The area ratio between the first region and the second region that are included in the unit pattern is at least 0.3 and not more than 0.9 and the unit pattern is a quadrangle with a short side of at least 3 pixels and not more than 10 pixels on the image, and thus, even if the contrast of the image decreases due to ambient light or the like, noise is added to the image sensor of the image capturing unit 30, and the pattern distorts due to the pattern being projected onto the slant surface of the target or the background, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

Figure 10:
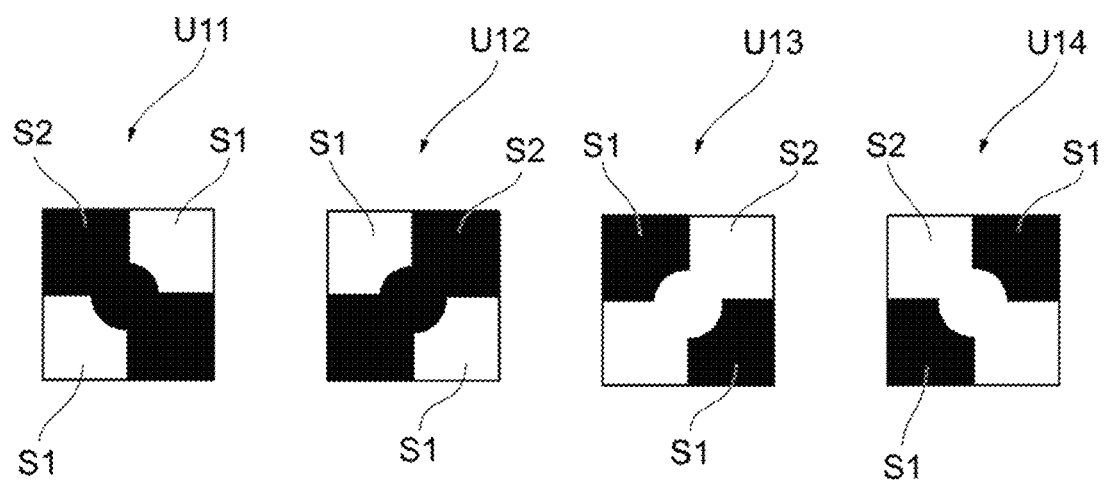
FIG. 10 is a diagram showing examples of unit patterns that are projected by the light projecting unit of the three-dimensional measurement apparatus according to this embodiment and constituted by a combination of figures with different encoded patterns.

FIG. 10 is a diagram showing examples of unit patterns that are projected by the light projecting unit 20 of the three-dimensional measurement apparatus 10 according to the present embodiment and constituted by a combination of figures with different encoded patterns. FIG. 10 shows a fifth unit pattern U11, a sixth unit pattern U12, a seventh unit pattern U13, and an eighth unit pattern U14. The fifth unit pattern U11, the sixth unit pattern U12, the seventh unit pattern U13, and the eighth unit pattern U14 are patterns that each include the first regions S1 and the second region S2, and each have a two-dimensional structure that is constituted by a combination of a circle and a grid pattern constituted by rectangles so as to be constituted by a combination of figures with different encoded patterns.

The fifth unit pattern U11 includes the white first regions S1 at its lower left and its upper right, and the black second region S2 extending from its upper left to its lower right. The sixth unit pattern U12 includes the white first regions S1 at its upper left and its lower right, and the black second region S2 extending from its lower left to its upper right. The seventh unit pattern U13 includes the black first regions S1 at its upper left and its lower right, and the white second region S2 extending from its lower left to its upper right. The eighth unit pattern U14 includes the black first regions S1 at its lower left and its upper right, and the white second region S2 extending from its upper left to its lower right.

Herein, a region indicated by white may be a bright region irradiated with light, and a region indicated by black may be a dark region that is not irradiated with light. As a matter of course, the region indicated by white may also be a dark region that is not irradiated with light, and the region indicated by black may also be a bright region irradiated with light. Also, the region indicated by white may also be a region irradiated with blue light, the region indicated by black may also be a region irradiated with red light, the region indicated by white may also be a region irradiated with light that is linearly polarized in a first direction, and the region indicated by black may also be a region irradiated with light that is linearly polarized in a second direction that is orthogonal to the first direction.

Figure 11:
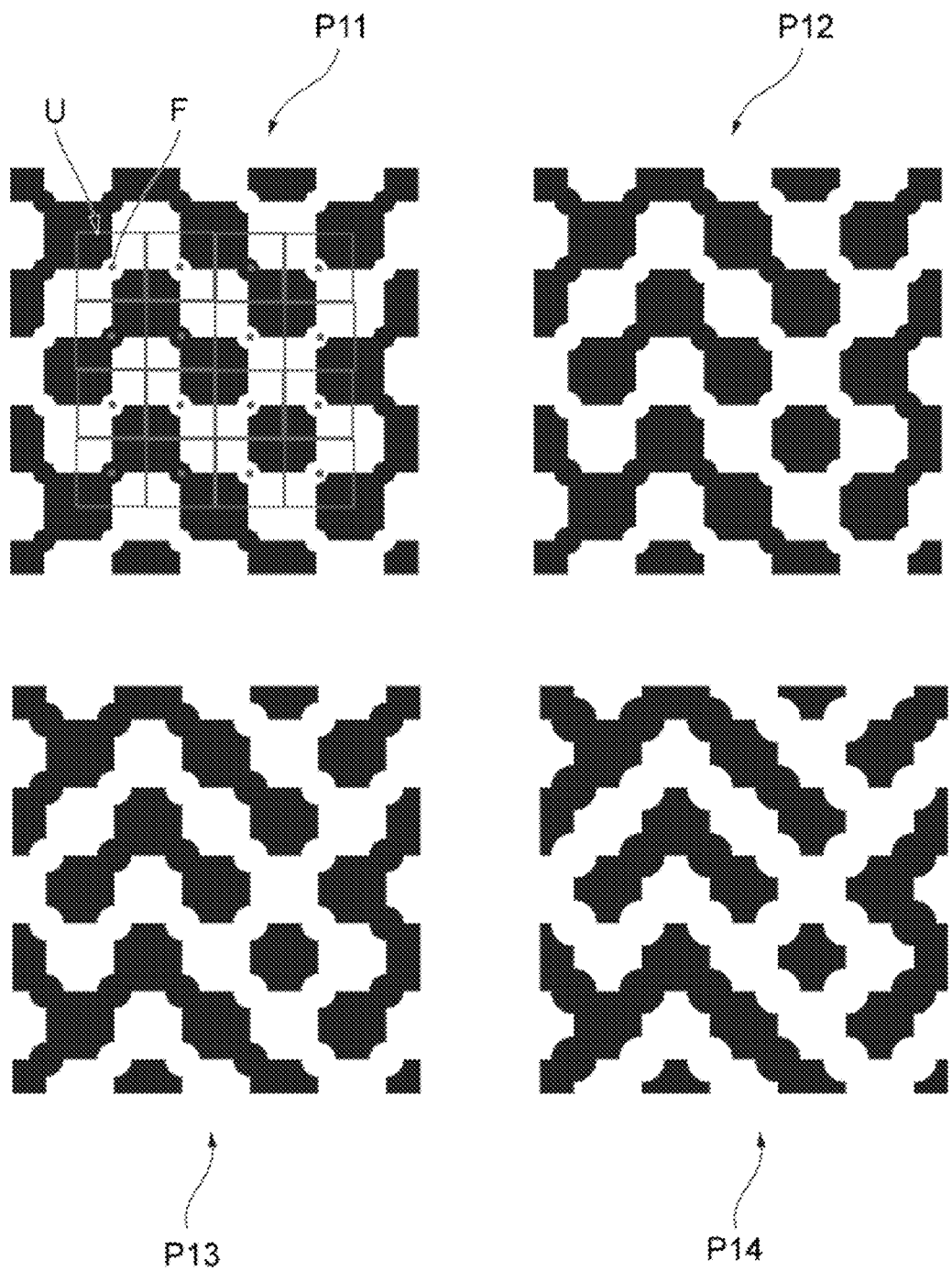
FIG. 11 is a diagram showing other examples of patterns that are projected by the light projecting unit of the three-dimensional measurement apparatus according to this embodiment and constituted by a combination of figures with different encoded patterns, the patterns having different area ratios between the first region and the second region.

FIG. 11 is a diagram showing examples of patterns that are projected by the light projecting unit 20 of the three-dimensional measurement apparatus 10 according to the present embodiment and constituted by a combination of figures with different encoded patterns, the patterns having different area ratios between the first region and the second region. FIG. 11 shows a seventh pattern P11, an eighth pattern P12, a ninth pattern P13, and a tenth pattern P14 that include the fifth unit patterns U11, the sixth unit patterns U12, the seventh unit patterns U13, and the eighth unit patterns U14 that are shown in FIG. 10, the seventh pattern P11, the eighth pattern P12, the ninth pattern P13, and the tenth pattern P14 having different area ratios between the first region and the second region without changing the length of four sides of each of the unit patterns. Also, with regard to the seventh pattern P11, the unit pattern U and feature points F extracted from the unit pattern U are shown. Note that the seventh pattern P11, the eighth pattern P12, the ninth pattern P13, and the tenth pattern P14 are enlarged portions of the patterns. Also, although the unit pattern U and the feature points F of the seventh pattern P11 are shown, similarly, the eighth pattern P12, the ninth pattern P13, and the tenth pattern P14 include the unit patterns, and their feature points are extracted from the unit patterns.

The seventh pattern P11 is an example in which the area ratio obtained by dividing the area of the first region included in the unit pattern U by the area of the second region is $4/5=0.8$. The eighth pattern P12 is an example in which the area ratio obtained by dividing the area of the first region included in the unit pattern by the area of the second region is $21/29 \approx 0.724$. The ninth pattern P13 is an example in which the area ratio obtained by dividing the area of the first region included in the unit pattern by the area of the second region is $3/5=0.6$. The tenth pattern P14 is an example in which the area ratio obtained by dividing the area of the first region included in the unit pattern by the area of the second region is $5/13 \approx 0.385$.

Figure 12:
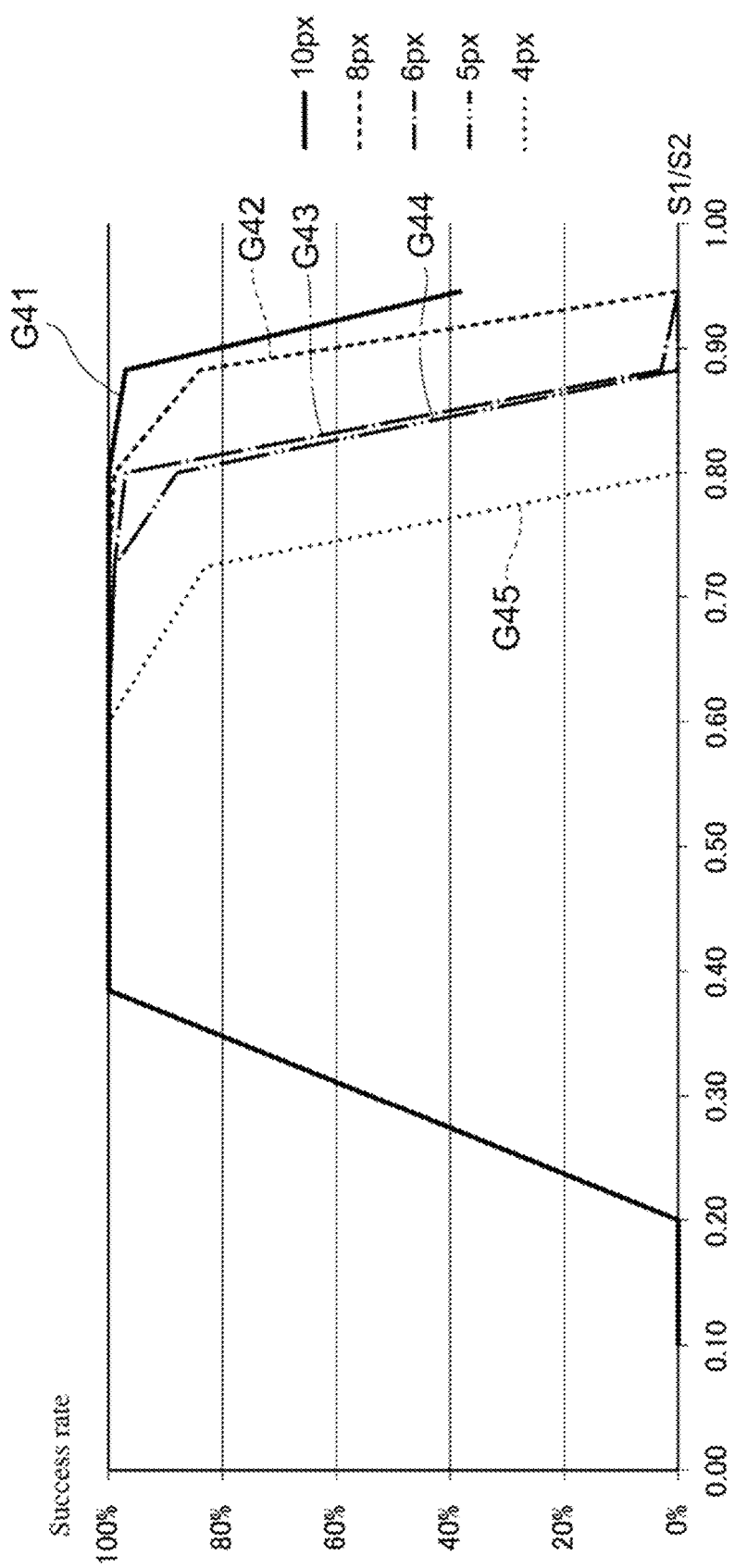
FIG. 12 is a graph showing the relationship between the area ratio between the first region and the second region of another exemplary pattern that was disordered in the first mode and a success rate when data is decoded from this pattern.

FIG. 12 is a graph showing the relationship between the area ratio between the first region and the second region and the success rate when data is decoded from the pattern when another exemplary pattern is disordered in the first mode which includes a plurality of unit patterns that each have a two-dimensional structure that is constituted by combing a circle and a grid pattern constituted by rectangles so as to be constituted by a combination of different figures with different encoded patterns. In FIG. 12, the case where the length of a short side of a unit pattern is 10 pixels on the image is indicated by a solid-line graph G41, the case where the length of a short side of a unit pattern is 8 pixels on the image is indicated by a broken-line graph G42, the case where the length of a short side of a unit pattern is 6 pixels on the image is indicated by a chain-line graph G43, the case where the length of a short side of a unit pattern is 5 pixels on the image is indicated by a chain double-dashed line graph G44, and the case where the length of a short side of a unit pattern is 4 pixels on the image is indicated by a dotted-line graph G45.

The pattern that was disordered in the first mode is a pattern obtained by reducing the contrast such that $M-L=30$ holds true where the brightness of the brightest pixel is M and the brightness of the darkest pixel is L, adding noise to the image based on a Gaussian distribution with a standard deviation of 5, and smoothing the image based on a Gaussian distribution with a standard deviation of 1. That is, the pattern that was disordered in the first mode is a pattern that reproduces the case where the contrast of the image decreases due to ambient light or the like, noise is added to the image sensor of the image capturing unit 30, and thereby the image is disordered.

According to the graphs G41 to G45, it can be seen that even if the length of the short side of the unit pattern is any one of 4 pixels to 10 pixels, when the area ratio between the first region and the second region of the unit pattern is 0.3, the success rate of decoding is at least 50%. Also, it can be seen that even if the length of the short side of the unit pattern is any one of 4 pixels to 10 pixels, when the area ratio between the first region and the second region of the unit pattern is in a range of about 0.4 to 0.7, the success rate of decoding is at least 80%. Also, it can be seen that even if the length of the short side of the unit pattern is any one of 5 pixels to 10 pixels, when the area ratio between the first region and the second region of the unit pattern is in a range of about 0.4 to 0.8, the success rate of decoding is at least 90%.

If the length of the short side of the unit pattern is in a range of 5 pixels to 10 pixels, for example, the setting unit 45 may also set the range of the area ratio between the first region and the second region of the unit pattern to about 0.4 to 0.8, and if the length of the short side of the unit pattern is 4 pixels, the setting unit 45 may also narrow the range of the area ratio between the first region and the second region of the unit pattern to about 0.4 to 0.7.

The area ratio between the first region and the second region that are included in the unit pattern is at least 0.3 and not more than 0.9 and the unit pattern is a quadrangle with a short side of at least 3 pixels and not more than 10 pixels on the image, and thus, even if the contrast of the image decreases due to ambient light or the like and noise is added to the image sensor of the image capturing unit 30, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

Figure 13:
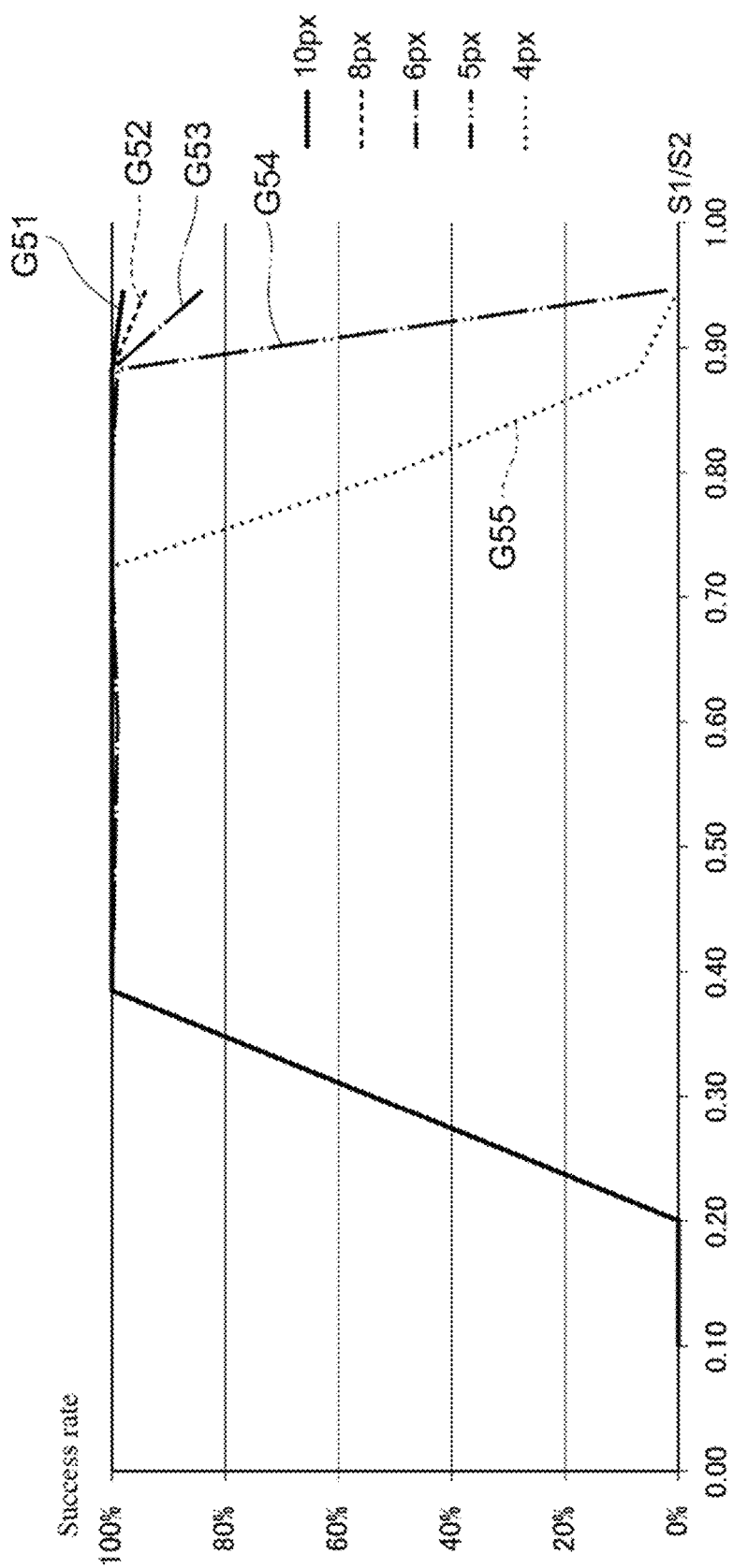
FIG. 13 is a graph showing the relationship between the area ratio between the first region and the second region of another exemplary pattern that was disordered in the second mode and a success rate when data is decoded from this pattern.

FIG. 13 is a graph showing the relationship between the area ratio between the first region and the second region and the success rate when data is decoded from the pattern when another exemplary pattern is disordered in the second mode which includes a plurality of unit patterns that each have a two-dimensional structure that is constituted by combing a circle and a grid pattern constituted by rectangles so as to be constituted by a combination of different figures with different encoded patterns. In FIG. 13, the case where the length of a short side of a unit pattern is 10 pixels on the image is indicated by a solid-line graph G51, the case where the length of a short side of a unit pattern is 8 pixels on the image is indicated by a broken-line graph G52, the case where the length of a short side of a unit pattern is 6 pixels on the image is indicated by a chain-line graph G53, the case where the length of a short side of a unit pattern is 5 pixels on the image is indicated by a chain double-dashed line graph G54, and the case where the length of a short side of a unit pattern is 4 pixels on the image is indicated by a dotted-line graph G55.

The pattern that was disordered in the second mode is a pattern that reproduces the case where noise is added to the image based on a Gaussian distribution with a standard deviation of 5, the image is smoothed based on a Gaussian distribution with a standard deviation of 1, the image is enlarged by 20% in the X-axis direction, shear deformation is performed at 20 degrees in the direction in which the pattern extends, and thereby the image is disordered. That is, the pattern that was disordered in the second mode is a pattern that reproduces the case where the contrast of the image decreases due to ambient light or the like, noise is added to the image sensor of the image capturing unit 30, the pattern distorts due to the pattern being projected onto the slant surface of the target or the background, and thereby the image is disordered.

According to the graphs G51 to G55, it can be seen that even if the length of the short side of the unit pattern is any one of 4 pixels to 10 pixels, when the area ratio between the first region and the second region of the unit pattern is 0.3, the success rate of decoding is at least 50%. Also, it can be seen that even if the length of the short side of the unit pattern is any one of 4 pixels to 10 pixels, when the area ratio between the first region and the second region of the unit pattern is in a range of about 0.4 to 0.7, the success rate of decoding is approximately 100%. Also, it can be seen that if the length of the short side of the unit pattern is any one of 5 pixels to 10 pixels, when the area ratio between the first region and the second region of the unit pattern is in a range of about 0.4 to 0.9, the success rate of decoding is approximately 100%.

The area ratio between the first region and the second region that are included in the unit pattern is at least 0.3 and not more than 0.9 and the unit pattern is a quadrangle with a short side of at least 3 pixels and not more than 10 pixels on the image in this manner, and thus, even if the contrast of the image decreases due to ambient light or the like, noise is added to the image sensor of the image capturing unit 30, and the pattern distorts due to the pattern being projected onto the slant surface of the target or the background, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

Figure 14:
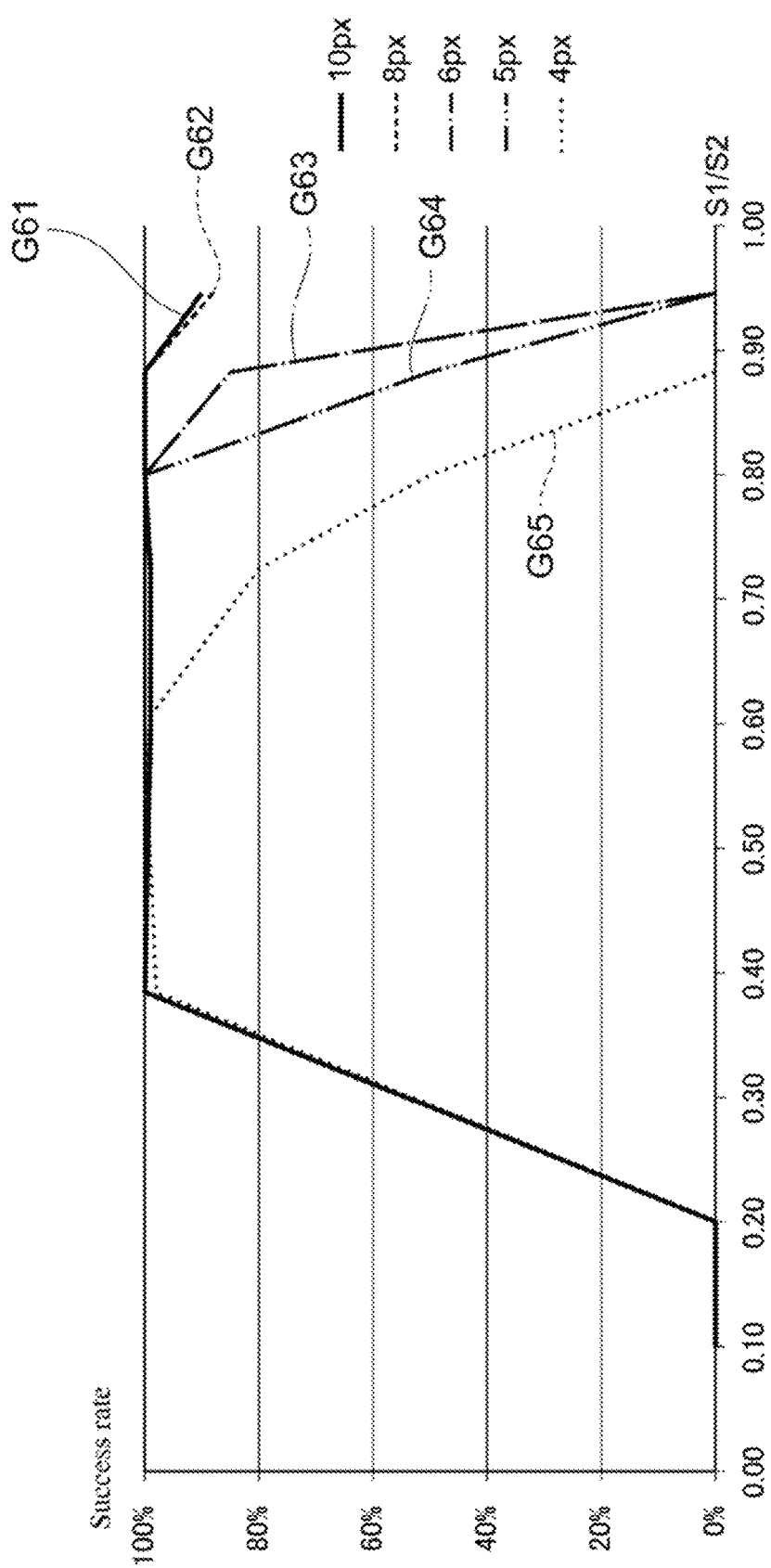
FIG. 14 is a graph showing the relationship between the area ratio between the first region and the second region of another exemplary pattern that was disordered in the third mode and a success rate when data is decoded from this pattern.

FIG. 14 is a graph showing the relationship between the area ratio between the first region and the second region and the success rate when data is decoded from the pattern when another exemplary pattern is disordered in the third mode which includes a plurality of unit patterns that each have a two-dimensional structure that is constituted by combing a circle and a grid pattern constituted by rectangles so as to be constituted by a combination of different figures with different encoded patterns. In FIG. 14, the case where the length of a short side of a unit pattern is 10 pixels on the image is indicated by a solid-line graph G61, the case where the length of a short side of a unit pattern is 8 pixels on the image is indicated by a broken-line graph G62, the case where the length of a short side of a unit pattern is 6 pixels on the image is indicated by a chain-line graph G63, the case where the length of a short side of a unit pattern is 5 pixels on the image is indicated by a chain double-dashed line graph G64, and the case where the length of a short side of a unit pattern is 4 pixels on the image is indicated by a dotted-line graph G65.

The pattern that was disordered in the third mode is a pattern that reproduces the case where noise is added to the image based on a Gaussian distribution with a standard deviation of 5, the image is smoothed based on a Gaussian distribution with a standard deviation of 1, the image is reduced by 20% in the X-axis direction, shear deformation is performed at 20 degrees in the direction in which the pattern shrinks, and thereby the image is disordered. That is, the pattern that was disordered in the third mode is a pattern that reproduces the case where the contrast of the image decreases due to ambient light or the like, noise is added to the image sensor of the image capturing unit 30, the pattern distorts due to the pattern being projected onto the slant surface of the target or the background, and thereby the image is disordered.

According to the graphs G61 to G65, it can be seen that even if the length of the short side of the unit pattern is any one of 4 pixels to 10 pixels, when the area ratio between the first region and the second region of the unit pattern is 0.3, the success rate of decoding is at least 50%. Also, it can be seen that even if the length of the short side of the unit pattern is any one of 4 pixels to 10 pixels, when the area ratio between the first region and the second region of the unit pattern is in a range of about 0.4 to 0.7, the success rate of decoding is at least 90%. Also, it can be seen that if the length of the short side of the unit pattern is in a range of 5 pixels to 10 pixels, when the area ratio between the first region and the second region of the unit pattern is in a range of about 0.4 to 0.8, the success rate of decoding is approximately 100%.

The area ratio between the first region and the second region that are included in the unit pattern is at least 0.3 and not more than 0.9 and the unit pattern is a quadrangle with a short side of at least 3 pixels and not more than 10 pixels on the image in this manner, and thus, even if the contrast of the image decreases due to ambient light or the like, noise is added to the image sensor of the image capturing unit 30, and the pattern distorts due to the pattern being projected onto the slant surface of the target or the background, it is possible to identify the first region and the second region, to extract the feature points of the unit pattern, and to decode data expressed by the unit pattern. Thus, the three-dimensional measurement apparatus 10 according to the present embodiment makes it possible to measure a three-dimensional shape of a target at higher resolution while increasing the robustness against a change in the image capturing conditions.

According to FIGS. 7 to 9 and 12 to 14, even if a pattern that includes a plurality of unit patterns that each have a two-dimensional structure in which one relatively small square is disposed at the center of the grid pattern that is constituted by relatively large squares as shown in FIG. 4 or another exemplary pattern that includes a plurality of unit patterns that each have a two-dimensional structure that is constituted by combining a circle and the grid pattern constituted by rectangles shown in FIG. 11 is used, if the area ratio between the first region and the second region that are included in the unit pattern is at least 0.3 and not more than 0.9, and the unit pattern is a quadrangle with a short side of at least 3 pixels and not more than 10 pixels on the image, the success rate when data is decoded from the pattern sufficiently increases. Thus, it seems that the success rate when data is decoded from the pattern is not influenced by the pattern that constitutes the two-dimensional structure of the unit pattern, and the area ratio between the first region and the second region that are included in the unit pattern and the number of pixels of the short side of the unit pattern on the image are important.

Figure 15:
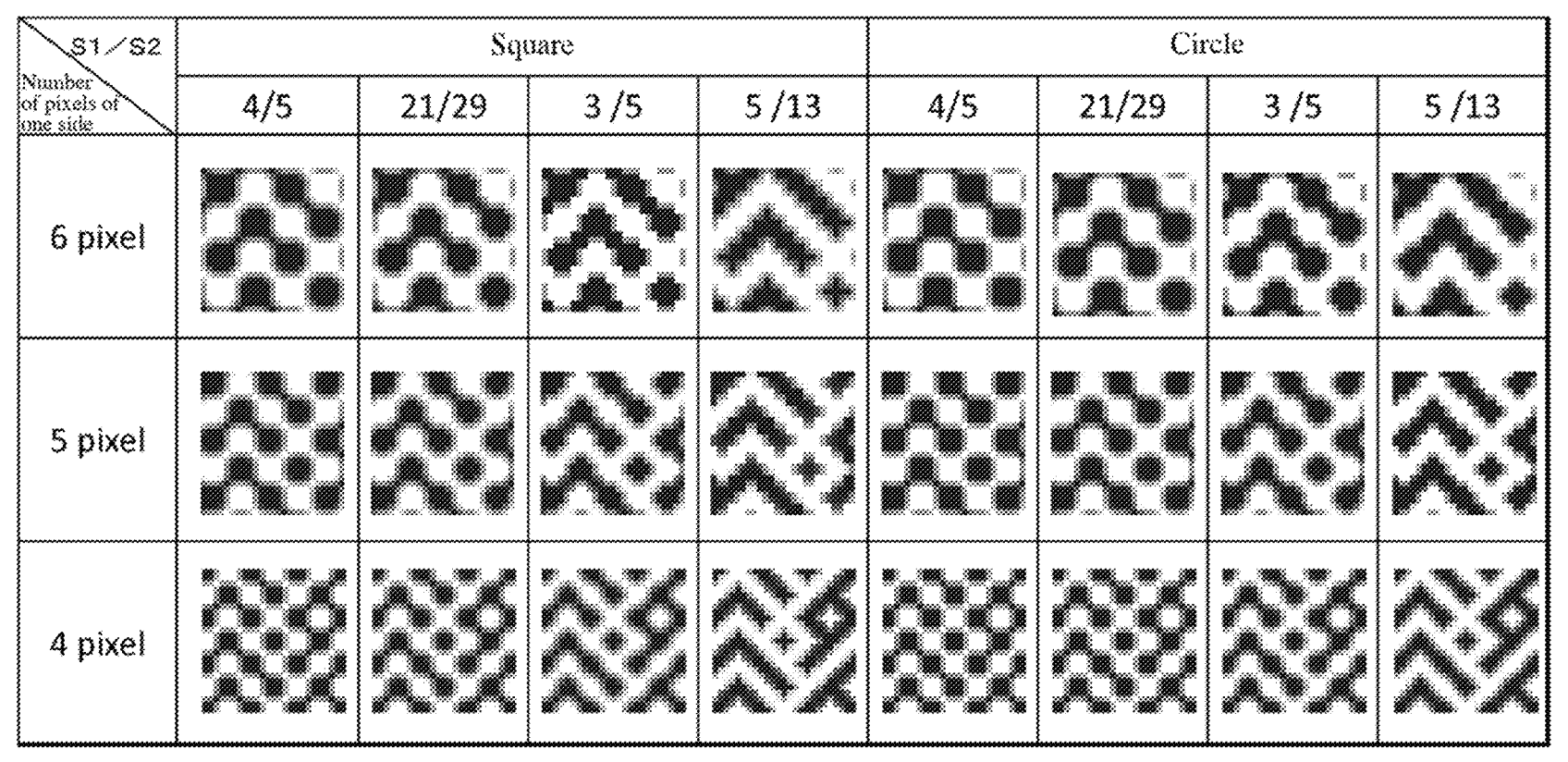

FIG. 15 is a diagram of a list of examples of patterns that are projected by the light projecting unit 20 of the three-dimensional measurement apparatus 10 according to the present embodiment and constituted by a combination of figures with different encoded patterns, the patterns having different area ratios between the first region and the second region. FIG. 15 shows examples of patterns when the area ratio "S1/S2" obtained by dividing the area of the first region by the area of the second region is changed to "4/5", "21/29", "3/5", and "5/13" if the figure disposed at the center of the unit pattern is a "square", when the length of a short side of the unit pattern is 6 pixels, 5 pixels, or 4 pixels on the image. Also, FIG. 15 shows examples of patterns when the area ratio "S1/S2" obtained by dividing the area of the first region by the area of the second region is changed to "4/5", "21/29", "3/5", and "5/13" if the figure disposed at the center of the unit pattern is a "circle", when the length of the short side of the unit pattern is 6 pixels, 5 pixels, or 4 pixels on the image.

The patterns shown in FIG. 15 each have an area ratio S1/S2 of at least 0.3 and not more than 0.9, the area ratio S1/S2 being obtained by dividing the area of the first region of the unit pattern by the area of the second region, and the unit pattern is a quadrangle with a short side of at least 3 pixels and not more than 10 pixels on the image. Use of such a pattern makes it possible to measure a three-dimensional shape of a target at higher resolution while increasing the robustness against a change in the image capturing conditions.

Figure 16:
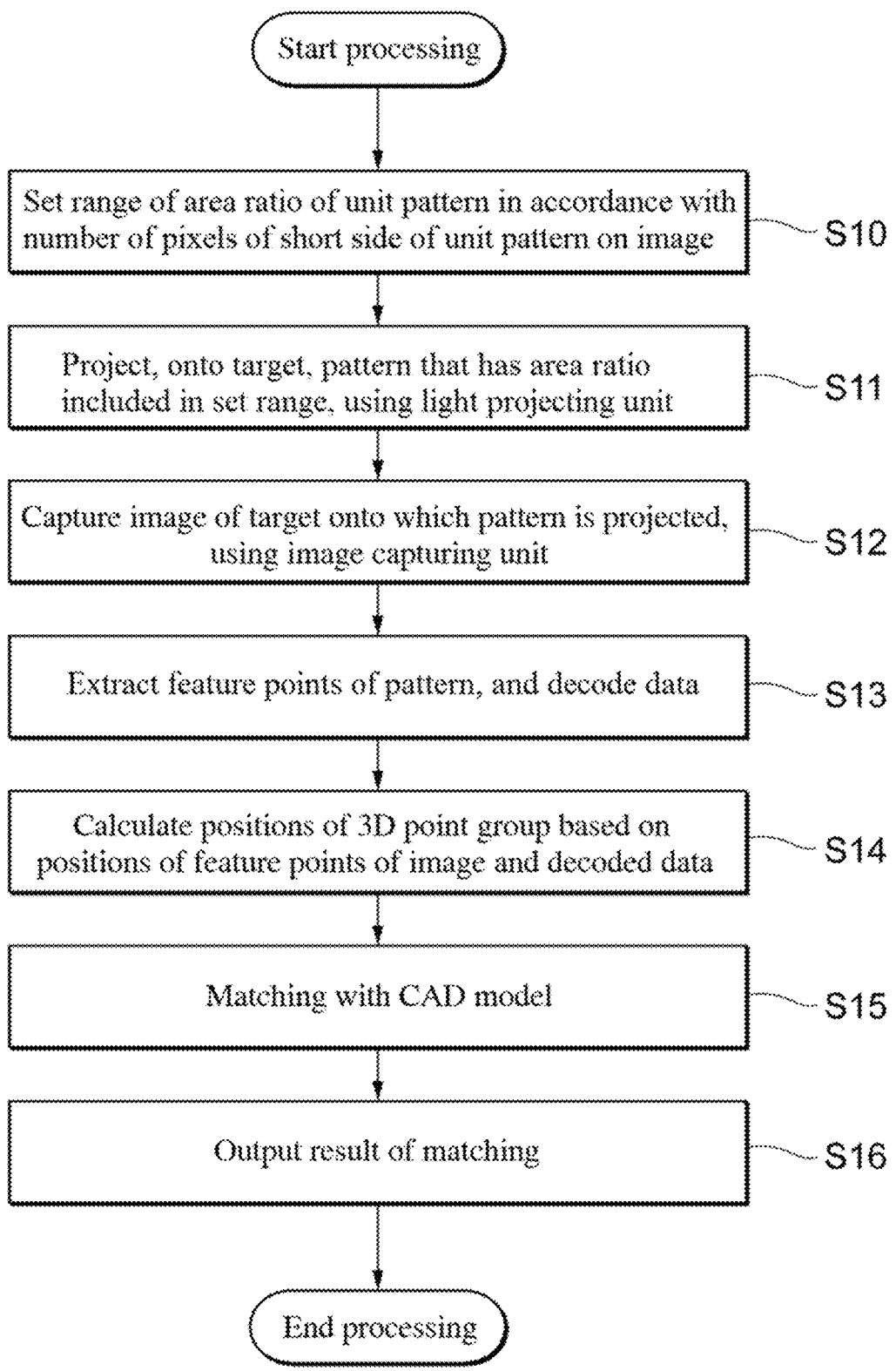
FIG. 16 is a flowchart of processing for measuring a three-dimensional shape of a target that is executed by the three-dimensional measurement apparatus according to this embodiment.

FIG. 16 is a flowchart of processing for measuring a three-dimensional shape of a target that is executed by the three-dimensional measurement apparatus 10 according to the present embodiment. Note that prior to the processing for measuring a three-dimensional shape of a target, the light projecting unit 20 and the image capturing unit 30 may also be calibrated, a test pattern may be projected by the light projecting unit 20 and captured by the image capturing unit 30 to check how large a unit pattern included in the test pattern is on the image, and the amount of light projected by the light projecting unit 20, the aperture and the exposure time of the image capturing unit 30 may also be adjusted.

The three-dimensional measurement apparatus 10 sets the range of the area ratio obtained by dividing the area of the first region of the unit pattern by the area of the second region in accordance with the number of pixels of the short side of the unit pattern on the image (step S10). Herein, the range of the area ratio may be set such that the range becomes narrower as the number of pixels of the short side of the unit pattern is smaller on the image.

The three-dimensional measurement apparatus 10 projects, using the light projecting unit 20, onto a target, a pattern having a two-dimensional structure in which unit patterns that each have the first region and the second region that have an area ratio included in the set range are arranged in the form of a grid (step S11). The three-dimensional measurement apparatus 10 captures an image of the target onto which the pattern is projected, using the image capturing unit 30 (step S12). Herein, the image capturing unit 30 should capture one image of the target onto which the pattern is projected.

The three-dimensional measurement apparatus 10 extracts feature points from each of the unit patterns included in the pattern, and decodes data encoded with a two-dimensional structure of the unit patterns (step S13).

The three-dimensional measurement apparatus 10 calculates positions of the three-dimensional point group based on the positions of the feature points of the image and the decoded data (step S14).

Thereafter, the three-dimensional measurement apparatus 10 performs matching between the three-dimensional point group and a CAD model (step S15). Finally, the three-dimensional measurement apparatus 10 outputs a result of matching (step S16). Thus, the three-dimensional shape measurement processing ends. Note that matching between the three-dimensional point group and the CAD model and outputting its result may also be omitted, and the three-dimensional measurement apparatus 10 may also output the calculated positions of the three-dimensional point group and ends the three-dimensional shape measurement processing.

§ 4 Modifications 4.1

Figure 17:
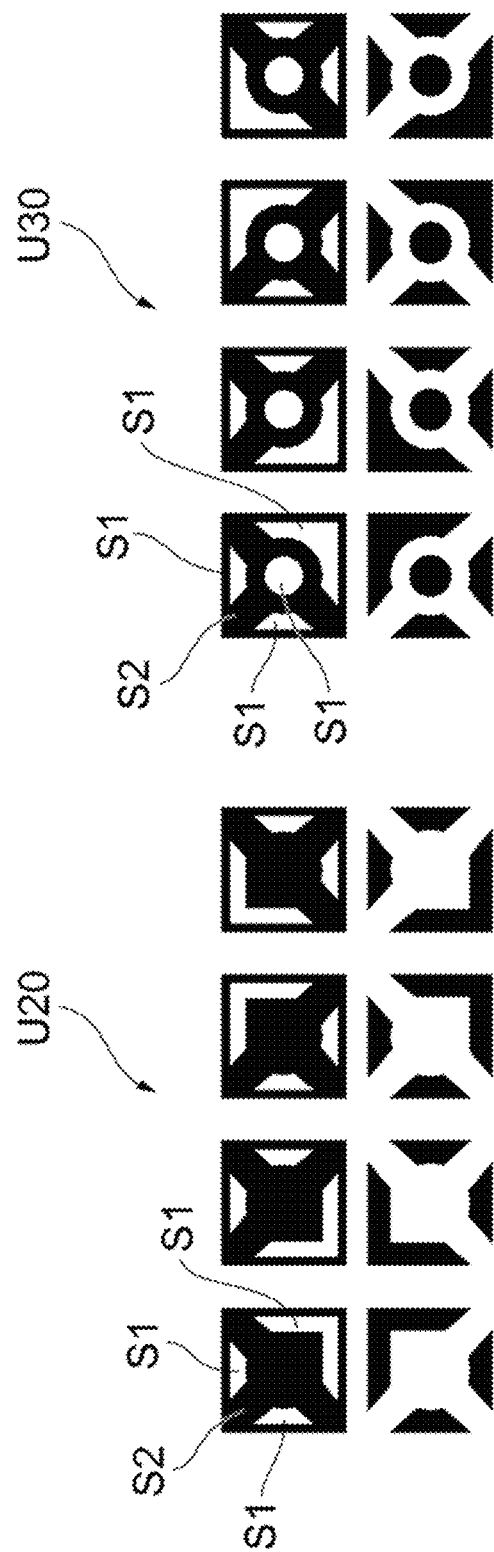
FIG. 17 is a diagram showing examples of unit patterns projected by the light projecting unit of the three-dimensional measurement apparatus according to a first modification of this embodiment.

FIG. 17 is a diagram showing examples of unit patterns that are projected by the light projecting unit 20 of the three-dimensional measurement apparatus 10 according to a first modification in the present embodiment. FIG. 17 shows a first unit pattern group U20 including 8 exemplary unit patterns and a second unit pattern group U30 including 8 exemplary unit patterns.

With regard to the exemplary unit pattern shown at the upper left of the first unit pattern group U20, the first regions S1 and the second region S2 are shown. As shown in FIG. 17, the first regions S1 may be separated (divided) into at least 3 while flanking the second region S2 in the unit pattern. Also, the area ratio obtained by dividing the area of the first region S1 by the area of the second region S2 may be at least 0.3 and not more than 0.9.

Also, with regard to the exemplary unit pattern shown at the upper left of the second unit pattern group U30, the first regions S1 and the second region S2 are shown. As shown in FIG. 17, the first regions S1 may be separated into at least 3 while flanking the second region S2 in the unit pattern. Also, the area ratio obtained by dividing the area of the first region S1 by the area of the second region S2 may be at least 0.3 and not more than 0.9.

Because the first regions S1 are separated into at least 3 while flanking the second region S2 in the unit pattern, it is possible to make the two-dimensional structure of the unit pattern relatively complicated, to increase the number of bits that can be expressed by the unit pattern, and to easily specify the position of the unit pattern. Thus, it is possible to reduce the number of unit patterns that need to be decoded in order to specify a row of the pattern, to shorten window matching processing time, and to reduce a calculation load of image recognition for measuring a three-dimensional shape of a target, while ensuring the robustness against a change in the image capturing conditions.

4.2

Figure 18:
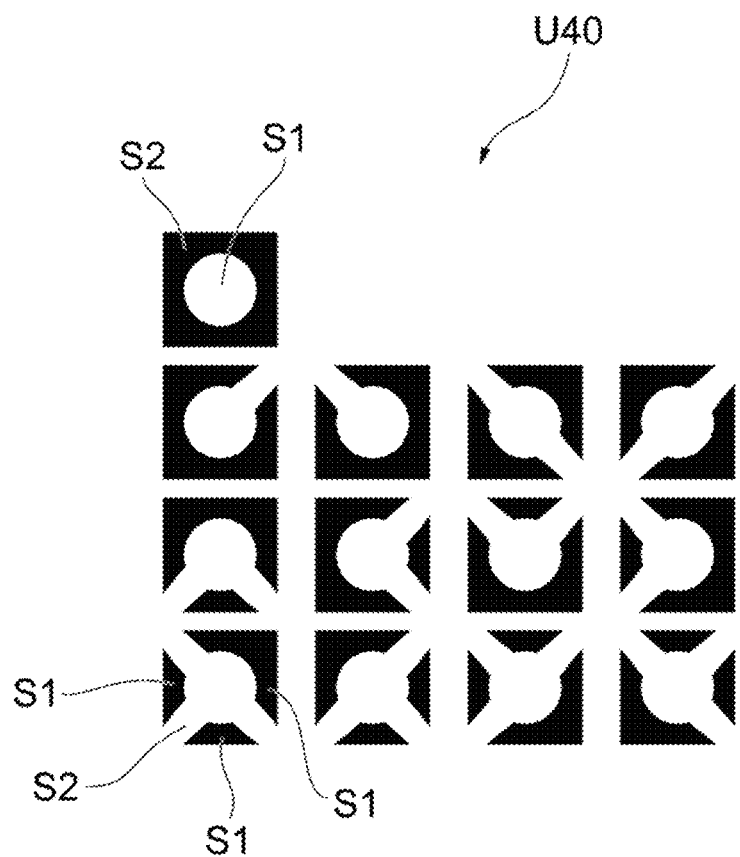
FIG. 18 is a diagram showing examples of unit patterns projected by the light projecting unit of the three-dimensional measurement apparatus according to a second modification of this embodiment.

FIG. 18 is a diagram showing examples of unit patterns that are projected by the light projecting unit 20 of the three-dimensional measurement apparatus 10 according to a second modification in the present embodiment. FIG. 18 shows a third unit pattern group U40 including 13 exemplary unit patterns.

With regard to the exemplary unit pattern shown at the upper left of the third unit pattern group U40, the first region S1 and the second region S2 are shown. As shown in FIG. 18, the unit pattern may include a two-dimensional shape in which the first region S1 is continuous and not divided. In this example, the first region S1 is a region surrounded by the second region S2. Also, the area ratio obtained by dividing the area of the first region S1 by the area of the second region S2 may be at least 0.3 and not more than 0.9.

The two-dimensional shape in which the first region S1 is continuous and not divided makes it possible to simplify the two-dimensional structure of the unit pattern and to facilitate identifying the first region S1 and the second region S2.

Also, with regard to the exemplary unit pattern shown at the lower left of the third unit pattern group U40, the first regions S1 and the second region S2 are shown. As shown in FIG. 18, the first regions S1 may be separated into at least 3 while flanking the second region S2 in the unit pattern. Also, the area ratio obtained by dividing the area of the first region S1 by the area of the second region S2 may be at least 0.3 and not more than 0.9.

Separating the first regions S1 into at least 3 while flanking the second region S2 in the unit pattern makes it possible to make the two-dimensional structure of the unit pattern relatively complicated, to increase the number of bits that can be expressed by the unit pattern, and to further increase the density of data decoded by the pattern. Thus, it is possible to reduce the number of unit patterns that need to be decoded in order to specify a row of the pattern, and to reduce a calculation load of image recognition for measuring a three-dimensional shape of a target, while ensuring the robustness against a change in the image capturing conditions.

As shown as an example of the third unit pattern group U40, the pattern that is projected onto the target by the light projecting unit 20 may also include a unit pattern including a two-dimensional shape in which the first region is continuous and not divided, and a unit pattern including a two-dimensional shape in which the first regions are separate from each other while flanking the second region. In this manner, increasing the variation of the two-dimensional structure of the unit pattern makes it possible to increase the number of bits that can be expressed by the unit pattern and to increase the density of data encoded by the pattern. Thus, it is possible to reduce the number of unit patterns that need to be decoded in order to specify a row of the pattern, to perform matching between the pattern on the image and the projected pattern through less computation, and to reduce a calculation load of image recognition for measuring a three-dimensional shape of a target.

4.3

Figure 19:
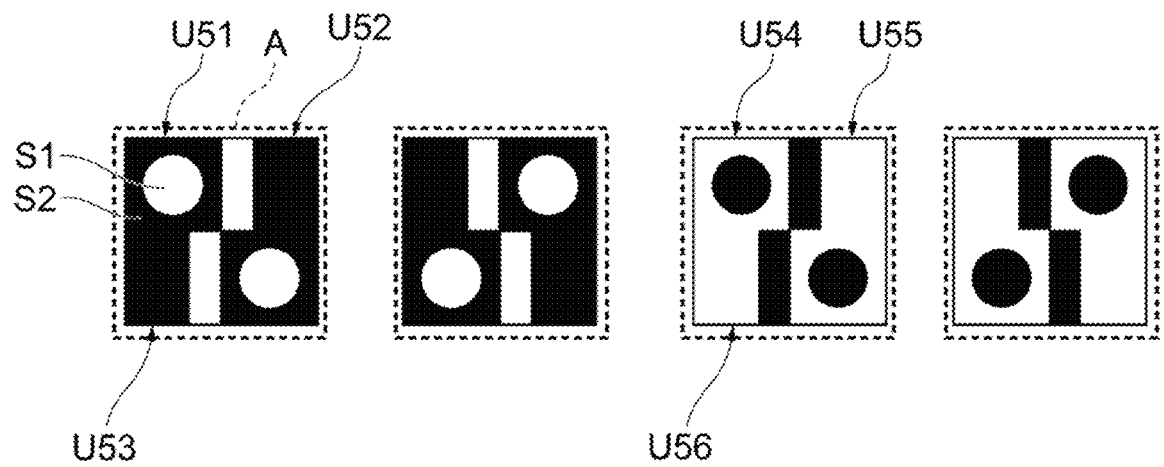
FIG. 19 is a diagram showing examples of patterns projected by the light projecting unit of the three-dimensional measurement apparatus according to a third modification of this embodiment.

FIG. 19 is a diagram showing examples of patterns that are projected by the light projecting unit 20 of the three-dimensional measurement apparatus 10 according to a third modification in the present embodiment. FIG. 19 shows four exemplary encoded regions A, and the encoded region A is constituted such that a unit pattern U51, a unit pattern U52, and a unit pattern U53 are arranged in a 2×2 grid shape, or is constituted such that a unit pattern U54, a unit pattern U55, and a unit pattern U56 are arranged in a 2×2 grid shape. One piece of data may be decoded from one encoded region A, and information with 4 bits can be expressed using the four encoded regions A shown in this example.

With regard to the unit pattern U51 shown at the upper left of the encoded region A, the first region S1 and the second region S2 are shown. As shown in FIG. 19, the unit pattern may include a two-dimensional shape in which the first region S1 is continuous and not divided. Also, the area ratio obtained by dividing the area of the first region S1 by the area of the second region S2 may be at least 0.3 and not more than 0.9.

4.4

Figure 20:
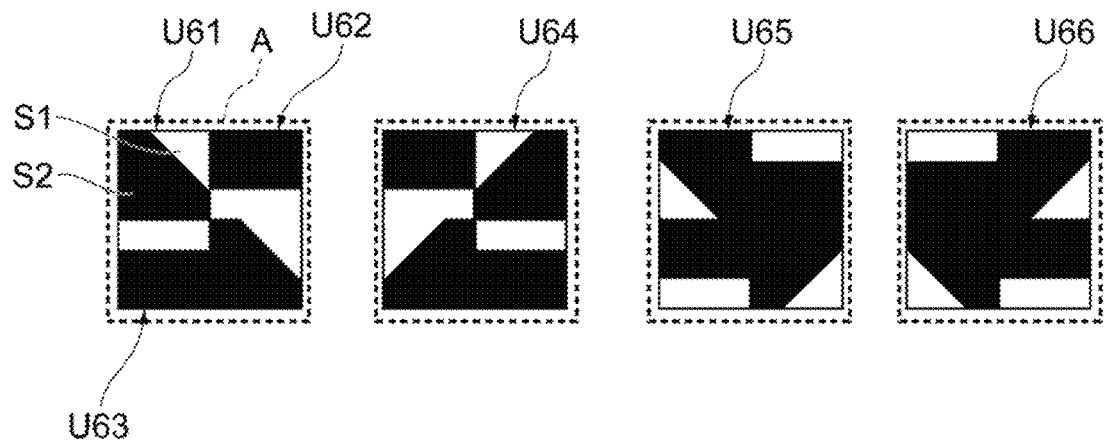
FIG. 20 is a diagram showing examples of patterns projected by the light projecting unit of the three-dimensional measurement apparatus according to a fourth modification of this embodiment.

FIG. 20 is a diagram showing examples of patterns that are projected by the light projecting unit 20 of the three-dimensional measurement apparatus 10 according to a fourth modification in the present embodiment. FIG. 20 shows four exemplary encoded regions A, and the encoded region A is constituted such that a unit pattern U61, a unit pattern U62, and a unit pattern U63 are arranged in a 2×2 grid shape, is constituted such that a unit pattern U64, the unit pattern U62, and the unit pattern U63 are arranged in a 2×2 grid shape, is constituted such that a unit pattern U65, the unit pattern U62, and the unit pattern U63 are arranged in a 2×2 grid shape, or is constituted such that a unit pattern U66, the unit pattern U62, and the unit pattern U63 are arranged in a 2×2 grid shape. One piece of data may be decoded from one encoded region A, and information with 4 bits can be expressed using the four encoded regions A shown in this example.

With regard to the unit pattern U61 shown at the upper left of the encoded region A, the first region S1 and the second region S2 are shown. As shown in FIG. 20, the unit pattern may include a two-dimensional shape in which the first region S1 is continuous and not divided. Also, the area ratio obtained by dividing the area of the first region S1 by the area of the second region S2 may be at least 0.3 and not more than 0.9.

4.5

Figure 21:
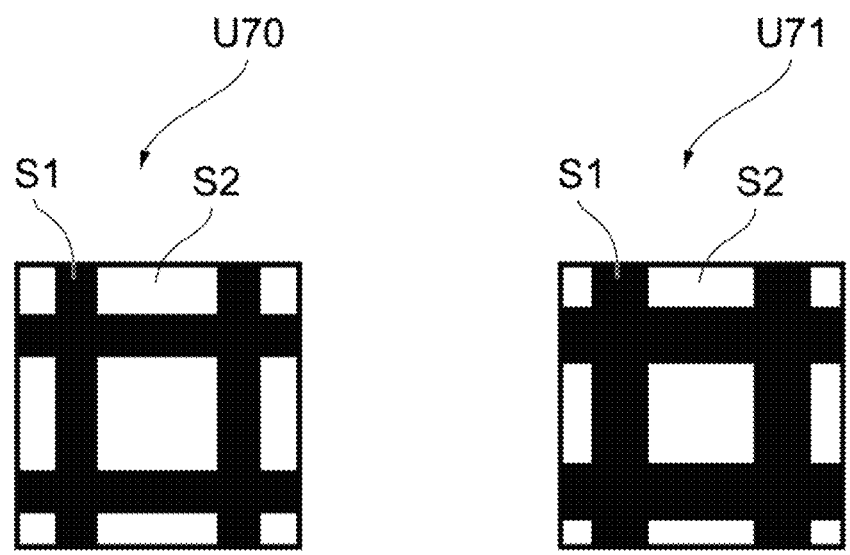
FIG. 21 is a diagram showing examples of unit patterns projected by the light projecting unit of the three-dimensional measurement apparatus according to a fifth modification of this embodiment.

FIG. 21 is a diagram showing examples of unit patterns that are projected by the light projecting unit 20 of the three-dimensional measurement apparatus 10 according to a fifth modification in the present embodiment. FIG. 21 shows examples of a unit pattern U70 and a unit pattern U71. The unit pattern U70 and the unit pattern U71 each include grid-shaped lattice pattern, and their lattices have different thicknesses. With the unit pattern U70 and the unit pattern U71, the area ratio obtained by dividing the area of the first region S1 by the area of the second region S2 is changed by changing the thickness of their lattice.

The first regions S1 are separated into at least 3 while flanking the second regions S2 in the unit pattern U70 and the unit pattern U71, specifically, the first regions S1 are separated into 9. In this example, the area ratio obtained by dividing the area of the first region S1 by the area of the second region S2 may also be at least 0.3 and not more than 0.9.

Separating the first regions S1 into at least 3 while flanking the second region S2 in the unit pattern makes it possible to make the two-dimensional structure of the unit pattern relatively complicated, to increase the number of bits that can be expressed by the unit pattern, and to further increase the density of data decoded by the pattern. Thus, it is possible to reduce the number of unit patterns that need to be decoded in order to specify a row of the pattern, and to reduce a calculation load of image recognition for measuring a three-dimensional shape of a target, while ensuring the robustness against a change in the image capturing conditions.

The above-described embodiment is for facilitating understanding of the present invention and are not intended to limit the interpretation of the present invention. Elements included in the embodiment and their arrangement, materials, conditions, shapes, size, and the like are not limited to the examples and can be changed as appropriate. Also, it is possible to partially replace or combine configurations described in different embodiments.

Additional Remark 1

A three-dimensional measurement apparatus (10) including:

a light projecting unit (20) configured to project, onto a target, a pattern in which data is encoded with a two-dimensional structure;

an image capturing unit (30) configured to capture an image of the target onto which the pattern is projected; and a calculation unit (43) configured to extract feature points of the pattern and to calculate positions of a three-dimensional point group expressing a three-dimensional shape of the target based on positions of the feature points in the image and the decoded data, in which the pattern includes a plurality of unit patterns of minimum units that each express at least two bits, include a feature point, and are used in order to calculate the positions of the three-dimensional point group, the unit patterns each include a first region and a second region that is distinguished from the first region and has an area that is larger than an area of the first region, and an area ratio obtained by dividing the area of the first region by the area of the second region is at least 0.3 and not more than 0.9.

Additional Remark 2

The three-dimensional measurement apparatus (10) according to Additional Remark 1, in which the unit pattern is a quadrangle with a short side of at least 3 pixels and not more than 10 pixels on the image.

Additional Remark 3

The three-dimensional measurement apparatus (10) according to Additional Remark 1 or 2, in which the area ratio obtained by dividing the area of the first region by the area of the second region is at least 0.3 and not more than 0.9 on the image.

Additional Remark 4

The three-dimensional measurement apparatus (10) according to any one of Additional Remarks 1 to 3, further comprising:

a setting unit (45) configured to set a range of the area ratio of the pattern projected by the light projecting unit (20) in accordance with the number of pixels of a short side of the unit pattern on the image.

Additional Remark 5

The three-dimensional measurement apparatus (10) according to Additional Remark 4, in which the setting unit (45) is configured to narrow the range of the area ratio as the number of pixels of the short side of the unit pattern becomes smaller on the image.

Additional Remark 6

The three-dimensional measurement apparatus (10) according to any one of Additional Remarks 1 to 5, in which the first region and the second region are distinguished by brightness and darkness of the light projected by the light projecting unit (20).

Additional Remark 7

The three-dimensional measurement apparatus (10) according to any one of Additional Remarks 1 to 5, in which the first region and the second region are distinguished by wavelength bands of the light projected by the light projecting unit (20).

Additional Remark 8

The three-dimensional measurement apparatus (10) according to any one of Additional Remarks 1 to 5, in which the first region and the second region are distinguished by polarization of the light projected by the light projecting unit (20).

Additional Remark 9

The three-dimensional measurement apparatus (10) according to any one of Additional Remarks 1 to 8, in which the unit pattern includes a two-dimensional shape in which the first region is continuous and not divided.

Additional Remark 10

The three-dimensional measurement apparatus (10) according to any one of Additional Remarks 1 to 8, in which the unit pattern includes a two-dimensional shape in which the first region is divided while flanking the second region.

Additional Remark 11

The three-dimensional measurement apparatus (10) according to any one of Additional Remarks 1 to 8, in which the pattern includes a unit pattern including a two-dimensional shape in which the first region is continuous and not divided, and a unit pattern including a two-dimensional shape in which the first region is divided while flanking the second region.

Additional Remark 12

The three-dimensional measurement apparatus (10) according to Additional Remark 10 or 11, in which the first region is separated into two regions while flanking the second region in the unit pattern.

Additional Remark 13

The three-dimensional measurement apparatus (10) according to Additional Remark 10 or 11, in which the first region is separated into at least three regions while flanking the second region in the unit pattern.

Additional Remark 14

The three-dimensional measurement apparatus (10) according to any one of Additional Remarks 1 to 13, in which the light projecting unit (20) includes a modulation element configured to modulate a size of the pattern to be projected.

Additional Remark 15

A three-dimensional measurement method including:

projecting, onto a target, a pattern in which data is encoded with a two-dimensional structure;

capturing an image of the target onto which the pattern is projected;

extracting feature points of the pattern and calculating positions of a three-dimensional point group expressing a three-dimensional shape of the target based on positions of the feature points in the image and the decoded data, in which the pattern includes a plurality of unit patterns of minimum units that each express at least two bits, include a feature point, and are used in order to calculate the positions of the three-dimensional point group, the unit patterns each include a first region and a second region that is distinguished from the first region and has an area that is larger than an area of the first region, and an area ratio obtained by dividing the area of the first region by the area of the second region is at least 0.3 and not more than 0.9.

Additional Remark 16

A three-dimensional measurement program causing an arithmetic unit provided in a three-dimensional measurement apparatus (10) including a light projecting unit (20) configured to project, onto a target, a pattern in which data is encoded with a two-dimensional structure and an image capturing unit (30) configured to capture an image of the target onto which the pattern is projected, to operate as a calculation unit (43) configured to extract feature points of the pattern and to calculate positions of a three-dimensional point group expressing a three-dimensional shape of the target based on positions of the feature points in the image and the decoded data, in which the pattern includes a plurality of unit patterns of minimum units that each express at least two bits, include a feature point, and are used in order to calculate the positions of the three-dimensional point group, the unit patterns each include a first region and a second region that is distinguished from the first region and has an area that is larger than an area of the first region, and an area ratio obtained by dividing the area of the first region by the area of the second region is at least 0.3 and not more than 0.9.

The invention claimed is:

1. A three-dimensional measurement apparatus comprising:
    a projector configured to project, onto a target, a pattern in which data is encoded with a two-dimensional structure;
    a camera configured to capture an image of the target onto which the pattern is projected; and
    a processor configured to extract feature points of the pattern and to calculate positions of a three-dimensional point group expressing a three-dimensional shape of the target based on positions of the feature points in the image and the data that is decoded,
    wherein the pattern includes a plurality of unit patterns of minimum units that each expresses at least two bits, include the feature points, and are used in order to calculate the positions of the three-dimensional point group,
    the unit patterns each includes a first region and a second region that is distinguished from the first region and has an area that is larger than an area of the first region, and
    an area ratio obtained by dividing the area of the first region by the area of the second region is at least 0.3 and not more than 0.9.

2. The three-dimensional measurement apparatus according to claim 1,
    wherein the unit pattern is a quadrangle with a short side of at least 3 pixels and not more than 10 pixels on the image.

3. The three-dimensional measurement apparatus according to claim 1,
    wherein the processor is configured to set a range of the area ratio of the pattern projected by the projector, in accordance with a number of pixels of a short side of the unit pattern on the image.

4. The three-dimensional measurement apparatus according to claim 3,
    wherein the processor is configured to narrow a range of the area ratio as the number of pixels of the short side of the unit pattern becomes smaller on the image.

5. The three-dimensional measurement apparatus according to claim 1,
    wherein the first region and the second region are distinguished by brightness and darkness of the light projected by the projector.

6. The three-dimensional measurement apparatus according to claim 1,
    wherein the first region and the second region are distinguished by wavelength bands of the light projected by the projector.

7. The three-dimensional measurement apparatus according to claim 1,
    wherein the first region and the second region are distinguished by polarization of the light projected by the projector.

8. The three-dimensional measurement apparatus according to claim 1,
    wherein the unit pattern includes a two-dimensional shape in which the first region is continuous and not divided.

9. The three-dimensional measurement apparatus according to claim 1,
    wherein the unit pattern includes a two-dimensional shape in which the first region is divided while flanking the second region.

10. The three-dimensional measurement apparatus according to claim 1,
    wherein the pattern includes a unit pattern including a two-dimensional shape in which the first region is continuous and not divided, and a unit pattern including a two-dimensional shape in which the first region is divided while flanking the second region.

11. The three-dimensional measurement apparatus according to claim 9,
    wherein the first region is separated into two regions while flanking the second region in the unit pattern.

12. The three-dimensional measurement apparatus according to claim 9,
    wherein the first region is separated into at least three regions while flanking the second region in the unit pattern.

13. The three-dimensional measurement apparatus according to claim 1,
    wherein the projector includes a modulation element configured to modulate a size of the pattern to be projected.

14. A three-dimensional measurement method comprising:
    projecting, onto a target, a pattern in which data is encoded with a two-dimensional structure;
    capturing an image of the target onto which the pattern is projected;
    extracting feature points of the pattern and calculating positions of a three-dimensional point group expressing a three-dimensional shape of the target based on positions of the feature points in the image and the data that is decoded,
    wherein the pattern includes a plurality of unit patterns of minimum units that each expresses at least two bits, include the feature points, and are used in order to calculate the positions of the three-dimensional point group,
    the unit patterns each includes a first region and a second region that is distinguished from the first region and has an area that is larger than an area of the first region, and
    an area ratio obtained by dividing the area of the first region by the area of the second region is at least 0.3 and not more than 0.9.

15. A non-transitory computer readable medium, storing a three-dimensional measurement program, said program causing an arithmetic unit provided in a three-dimensional measurement apparatus including a projector configured to project, onto a target, a pattern in which data is encoded with a two-dimensional structure and a camera configured to capture an image of the target onto which the pattern is projected, to operate as a processor configured to extract feature points of the pattern and to calculate positions of a three-dimensional point group expressing a three-dimensional shape of the target based on positions of the feature points in the image and the data that is decoded,
  wherein the pattern includes a plurality of unit patterns of minimum units that each expresses at least two bits, include the feature points, and are used in order to calculate the positions of the three-dimensional point group,
  the unit patterns each includes a first region and a second region that is distinguished from the first region and has an area that is larger than an area of the first region, and
  an area ratio obtained by dividing the area of the first region by the area of the second region is at least 0.3 and not more than 0.9.

* * * * *